United States Patent
Wang et al.

(10) Patent No.: US 12,114,006 B2
(45) Date of Patent: Oct. 8, 2024

(54) METHOD AND APPARATUS FOR CONSTRUCTING MOTION INFORMATION LIST IN VIDEO ENCODING AND DECODING AND DEVICE

(71) Applicant: Tencent Technology (Shenzhen) Company Limited, Shenzhen (CN)

(72) Inventors: Yingbin Wang, Shenzhen (CN); Xiaozhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/896,937

(22) Filed: Aug. 26, 2022

(65) Prior Publication Data

US 2022/0417550 A1    Dec. 29, 2022

Related U.S. Application Data

(63) Continuation of application No. PCT/CN2021/106610, filed on Jul. 15, 2021.

(30) Foreign Application Priority Data

Jul. 29, 2020   (CN) .......................... 202010747207.0

(51) Int. Cl.
*H04N 19/52* (2014.01)
*H04N 19/109* (2014.01)
(Continued)

(52) U.S. Cl.
CPC ........... *H04N 19/52* (2014.11); *H04N 19/109* (2014.11); *H04N 19/11* (2014.11); *H04N 19/139* (2014.11);
(Continued)

(58) Field of Classification Search
CPC combination set(s) only.
See application file for complete search history.

(56) References Cited

U.S. PATENT DOCUMENTS

2014/0059058 A1    2/2014  Ohtsuki et al.
2015/0172723 A1*   6/2015  Amano ............... H04N 19/44
                                              375/240.16
(Continued)

FOREIGN PATENT DOCUMENTS

CN    109922336 A  *  6/2019  ........... H04N 19/105
CN    110460859 A     11/2019
(Continued)

OTHER PUBLICATIONS

Chen et al. (CN 109922336 A) machine English translation (Year: 2019).*

(Continued)

*Primary Examiner* — Sam K Ahn
*Assistant Examiner* — Amneet Singh
(74) *Attorney, Agent, or Firm* — Morgan, Lewis & Bockius LLP

(57) ABSTRACT

This application provides a method for constructing a motion information list in video encoding and decoding performed by a computer device. The method includes: obtaining a motion information list, which is a candidate motion information list is used for providing a candidate prediction displacement vector; determining at least one piece of motion information when a length of the motion information list meets a condition; and adding the at least one piece of motion information to the candidate motion information list to obtain an updated motion information list when a length of the candidate motion information list is less than a threshold. According to the embodiments of this application, by filling a motion information list using extra motion information when motion information included in (Continued)

the motion information list is insufficient, more effective displacement vectors are provided in the motion information list to achieve a better displacement vector prediction effect.

15 Claims, 5 Drawing Sheets

(51) Int. Cl.
    *H04N 19/11*         (2014.01)
    *H04N 19/139*       (2014.01)
    *H04N 19/159*       (2014.01)
    *H04N 19/169*       (2014.01)
    *H04N 19/172*       (2014.01)
    *H04N 19/70*         (2014.01)

(52) U.S. Cl.
    CPC ......... *H04N 19/159* (2014.11); *H04N 19/172* (2014.11); *H04N 19/1883* (2014.11); *H04N 19/70* (2014.11)

(56) References Cited

U.S. PATENT DOCUMENTS

| | | | |
|---|---|---|---|
| 2015/0264348 A1 | 9/2015 | Zou et al. | |
| 2015/0264351 A1* | 9/2015 | Miyoshi | H04N 19/139 375/240.13 |
| 2020/0077085 A1 | 3/2020 | Zhang et al. | |
| 2020/0236384 A1 | 7/2020 | Xu et al. | |
| 2021/0409686 A1* | 12/2021 | Xu | H04N 19/159 |

FOREIGN PATENT DOCUMENTS

| | | |
|---|---|---|
| CN | 110784723 A | 2/2020 |
| CN | 110858904 A | 3/2020 |
| CN | 110868589 A | 3/2020 |
| CN | 110876058 A | 3/2020 |
| CN | 110944190 A | 3/2020 |
| JP | 2020088451 A | 6/2020 |
| WO | WO 2020065508 A1 | 4/2020 |

OTHER PUBLICATIONS

Tencent Technology, WO, PCT/CN2021/106610, Sep. 28, 2021, 3 pgs.
Tencent Technology, IPRP, PCT/CN2021/106610, Jan. 31, 2023, 4 pgs.
Li Zhang et al., "History-Based Motion Vector Prediction in Versatile Video Coding", 2019 Data Compression Conference (DCC), Mar. 1, 2019, 1 pg., Retrieved from the Internet: https://www.semanticscholar.org/paper/History-Based-Motion-Vector-Prediction-in-Versatile-Zhang-Zhang/112eef3ecb0a0cab1c0a95284330c700745421ca.
Tencent Technology, ISR, PCT/CN2021/106610, Sep. 29, 2021, 2 pgs.
Tencent Technology, Extended European Search Report, EP Patent Application No. 21849304.7, Nov. 8, 2023, 9 pgs.
Xiaozhong Xu et al., "CE8-related: Unified Intra Block Copy Block Vector Prediction", Joint Video Experts Team (JVET) of ITU-T SG 16 WP 3 and ISO/IEC JTC 1/SC 29/WG 11, Document: JVET-N0382-v2, 14th Meeting, Geneva, CH, Mar. 19-27, 2019, 10 pgs.
Yi-Wen Chen et al., "CE4-related: Modified History-based MVP to Support Parallel Processing", Joint Video Experts Team (JVET) of ITU-T SG 16 WP 3 and ISO/IEC JTC 1/SC 29/WG 11, Document: JVET-L0106, 12th Meeting, Macao, CN, Oct. 3-12, 2018, 3 pgs.

* cited by examiner (a) Space domain     (b) Time domain

METHOD AND APPARATUS FOR CONSTRUCTING MOTION INFORMATION LIST IN VIDEO ENCODING AND DECODING AND DEVICE

CROSS-REFERENCE TO RELATED APPLICATIONS

This application is a continuation application of PCT Patent Application No. PCT/CN2021/106610, entitled "METHOD, APPARATUS, AND DEVICE FOR CONSTRUCTING MOTION INFORMATION LIST IN VIDEO CODING AND DECODING" filed on Jul. 15, 2021, which claims priority to Chinese Patent Application No. 202010747207.0, filed with the State Intellectual Property Office of the People's Republic of China on Jul. 29, 2020, and entitled "METHOD AND APPARATUS FOR CONSTRUCTING MOTION INFORMATION LIST IN VIDEO ENCODING AND DECODING AND DEVICE", all of which are incorporated herein by reference in their entirety.

This application is related to U.S. application Ser. No. 17/896,930, entitled "METHOD AND APPARATUS FOR CONSTRUCTING MOTION INFORMATION LIST IN VIDEO ENCODING AND DECODING AND DEVICE" filed on Aug. 26, 2022, which is incorporated herein by reference in its entirety.

FIELD OF THE TECHNOLOGY

Embodiments of this application relate to the field of video encoding and decoding technologies, and in particular, to a method and an apparatus for constructing a motion information list in video encoding and decoding and a device.

BACKGROUND OF THE DISCLOSURE

In current video compression technologies, for example, in versatile video coding (VVC) and audio video coding standard 3 (AVS3), a video codec generally needs to construct a motion information list to export a prediction displacement vector.

However, when displacement vectors included in the motion information list are insufficient, the motion information list cannot provide an effective prediction displacement vector, which affects the video compression performance.

SUMMARY

Embodiments of this application provide a method and an apparatus for constructing a motion information list in video encoding and decoding and a device. Therefore, when motion information included in a motion information list is insufficient, the motion information list is filled using extra motion information, to achieve a better displacement vector prediction effect, thereby improving the video compression performance. The technical solutions are as follows:

According to an aspect of the embodiments of this application, a method for constructing a motion information list in video encoding and decoding is provided, the method including:

obtaining a motion information list;

determining at least one piece of motion information when a length of the motion information list meets a condition, the length referring to a number of pieces of motion information included in the motion information list; and adding the at least one piece of motion information to the motion information list to obtain an updated motion information list.

According to an aspect of the embodiments of this application, an apparatus for constructing a motion information list in video encoding and decoding is provided, the apparatus including:

a list obtaining module, configured to obtain a motion information list;

an information determining module, configured to determine at least one piece of motion information when a length of the motion information list meets a condition, the length referring to a number of pieces of motion information included in the motion information list; and a list updating module, configured to add the at least one piece of motion information to the motion information list to obtain an updated motion information list.

According to an aspect of the embodiments of this application, a computer device is provided, including a processor and a memory, the memory storing at least one instruction, at least one program, a code set, or an instruction set, the at least one instruction, the at least one program, the code set, or the instruction set being loaded and executed by the processor to implement the foregoing method for constructing a motion information list in video encoding and decoding.

According to an aspect of the embodiments of this application, a computer-readable storage medium is provided, storing at least one instruction, at least one program, a code set, or an instruction set, the at least one instruction, the at least one program, the code set, or the instruction set being loaded and executed by a processor to implement the foregoing method for constructing a motion information list in video encoding and decoding.

According to a further aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium and executes the computer instructions, to cause the computer device to execute the foregoing method for constructing a motion information list in video encoding and decoding.

The technical solutions provided in the embodiments of this application may include the following beneficial effects:

by filling the motion information list using the extra motion information when the motion information included in the motion information list is insufficient, the motion information list is updated, so that more displacement vectors that are more effective are provided in the motion information list to achieve a better displacement vector prediction effect, thereby improving the video compression performance.

DESCRIPTION OF EMBODIMENTS

To make the objectives, technical solutions, and advantages of this application clearer, the following further describes implementations of this application in detail with reference to the accompanying drawings.

Figure 1:
FIG. 1 is an exemplary basic flowchart of a video encoding process according to this application.

Before the embodiments of this application are described, the video encoding technology is simply introduced first with reference to FIG. 1. FIG. 1 is an exemplary basic flowchart of a video encoding process.

A video signal refers to a picture sequence including a plurality of frames. A frame is a representation of spatial information of the video signal. A YUV mode is used as an example, one frame includes a brightness sample matrix (Y) and two chrominance sample matrices (Cb and Cr). From a perspective of an obtaining manner of a video signal, the obtaining manner may be divided into two manners: camera capturing and computer generation. Due to different statistical characteristics of the two manners, corresponding compression encoding manners may also be different.

In mainstream video encoding technologies, for example, in H.265/High Efficiency Video Coding (HEVC), H.266/Versatile Video Coding (VVC), and Audio Video Coding Standard (AVS, for example, AVS3), a series of operations and processing are performed on an inputted original video signal by using a hybrid coding framework as follows:

1. Block partition structure: An inputted picture is partitioned into a plurality of non-overlapping processing units, and similar compression operations are performed on all the processing units. The processing unit may be referred to as a coding tree unit (CTU) or a largest coding unit (LCU). Each CTU may further continue to be partitioned more finely into one or more basic coding units, which are referred to as coding units (CUs). Each CU is the most basic element in an encoding process. Various possible encoding modes for each CU are described below.

2. Predictive coding: The predictive coding includes modes such as intra-frame prediction and inter-frame prediction. After an original video signal is predicted using a selected reconstructed video signal, a residual video signal is obtained. An encoder side needs to select a most suitable one for a current CU from many possible predictive coding modes, and informs a decoder side. The intra-frame prediction refers to that a predicted signal comes from a region in a same picture that has been encoded and reconstructed. The inter-frame prediction refers to that a predicted signal comes from another picture (referred to as a reference picture) that has been encoded and that is different from a current picture.

3. Transform & Quantization: A residual video signal is transformed into a transform domain through a transform operation such as discrete Fourier transform (DFT) or discrete cosine transform (DCT), to generate a transform coefficient. A lossy quantization operation is further performed on the signal in the transform domain, which loses a specific amount of information, so that the quantized signal is conducive to compressed expression. In some video encoding standards, there may be more than one transform manner for selection. Therefore, the encoder side also needs to select one of the transform manners for the current CU and inform the decoder side. The fineness of quantization is generally determined by a quantization parameter (QP). A lager value of the QP represents that coefficients within a larger range will be quantized as a same output, and therefore, may usually bring a larger distortion and a lower bit rate. Conversely, a smaller value of the QP represents that coefficients within a smaller range will be quantized as a same output, and therefore, may usually bring a smaller distortion while corresponding to a higher bit rate.

4. Entropy coding or statistical coding: Statistical compression coding is performed on a quantized transform domain signal according to an occurrence frequency of each value, to finally output a binarized (0 or 1) compressed bitstream. In addition, other information such as a selected mode and a motion vector is generated through encoding, and entropy coding is also needed to reduce a bit rate. Statistical coding is a lossless coding mode that can effectively reduce a bit rate required for expressing a same signal. Common statistical coding modes include Variable Length Coding (VLC) or Content Adaptive Binary Arithmetic Coding (CABAC).

5. Loop filtering: A reconstructed decoded picture may be obtained through operations such as inverse quantization, inverse transform, and prediction compensation (reverse operations of the foregoing 2 to 4) on an encoded picture. Compared with an original picture, a reconstructed picture has some information different from that of the original picture due to impact of quantization, resulting in a distortion. A filtering operation, for example, deblocking, sample adaptive offset (SAO) filtering, or adaptive loop filter (ALF) filtering, is performed on the reconstructed picture, which can effectively reduce a degree of distortion produced by quantization. Because the filtered reconstructed picture is used as a reference for subsequently encoding a picture and is used for predicting a future signal, the foregoing filtering operation is also referred to as loop filtering, that is, a filtering operation in an encoding loop.

It can be learned according to the foregoing video encoding process that in the decoder side, after obtaining a compressed bitstream, for each CU, a decoder first performs entropy decoding to obtain various mode information and quantized transform coefficients. Inverse quantization and inverse transform are performed on the coefficients, to obtain a residual signal. On the other hand, a predicted signal corresponding to the CU may be obtained according to the known encoding mode information, and a reconstructed signal can be obtained by adding the residual signal and the predicted signal. Finally, a loop filtering operation needs to be performed on a reconstructed value of the decoded picture before a final output signal is generated.

In some mainstream video encoding standards such as HEVC, VVC, and AVS3, a block-based hybrid coding framework is used. In the standards, original video data is divided into a series of encoded blocks, and the video data is compressed in combination with video coding methods such as predictive, transform, and entropy coding. Motion compensation is a prediction method commonly used in video encoding, and the motion compensation exports a prediction value of a current encoded block from an encoded region based on redundant characteristics of video content in a time domain or space domain. Such prediction method includes inter-frame prediction, intra block copy prediction, and intra string copy prediction. In a specific encoding implementation, the prediction methods may be used independently or in combination. For an encoded block to which the prediction methods are applied, one or more two-dimensional displacement vectors generally need to be explicitly or implicitly encoded in a bitstream, to indicate displacements of one or more reference blocks of a current block (or a collocated block of the current block).

In different prediction modes and different implementations, the displacement vector may have different names, and the displacement vector in this specification is uniformly described in the following manners: 1) a displacement vector in the inter-frame prediction mode is referred to as a motion vector (MV); 2) a displacement vector in the intra block copy (IBC) prediction mode is referred to as a block vector (BV); and 3) a displacement vector in the intra string copy (ISC) prediction mode is referred to as a string vector (SV). ISC is also referred to as "string prediction" or "string matching".

An MV is a displacement vector used for the inter-frame prediction mode. The displacement vector points from a current picture to a reference picture, and a value thereof is a coordinate offset between the current block and the reference block, where the current block and the reference block are in two different pictures. In the intra-frame prediction mode, MV prediction may be introduced, to predict an MV of the current block to obtain a prediction MV corresponding to the current block. Performing encoding transmission on a difference between the prediction MV and an actual MV corresponding to the current block helps save bit overheads when compared with directly performing encoding transmission on the actual MV corresponding to the current block. In the embodiments of this application, the prediction MV refers to a prediction value of the MV of the current block obtained through an MV prediction technology.

A BV is a displacement vector used for the IBC prediction mode, and a value thereof is a coordinate offset between the current block and the reference block, where the current block and the reference block are both in the current picture. In the IBC prediction mode, BV prediction may be introduced, to predict a BV of the current block to obtain a prediction BV corresponding to the current block. Performing encoding transmission on a difference between the prediction BV and an actual BV corresponding to the current block helps save bit overheads when compared with directly performing encoding transmission on the actual BV corresponding to the current block. In the embodiments of this application, the prediction BV refers to a prediction value of the BV of the current block obtained through a BV prediction technology.

A SV is a displacement vector used for the ISC prediction mode, and a value thereof is a coordinate offset between a current string and a reference string, where the current string and the reference string are both in the current picture. In the ISC prediction mode, SV prediction may be introduced, to predict an SV of the current string to obtain a prediction SV corresponding to the current string. Performing encoding transmission on a difference between the prediction SV and an actual SV corresponding to the current string helps save bit overheads when compared with directly performing encoding transmission on the actual SV corresponding to the current string. In the embodiments of this application, the prediction SV refers to a prediction value of the SV of the current string obtained through an SV prediction technology.

The different prediction modes are introduced below:

I. Inter-Frame Prediction Mode.

Figure 2:
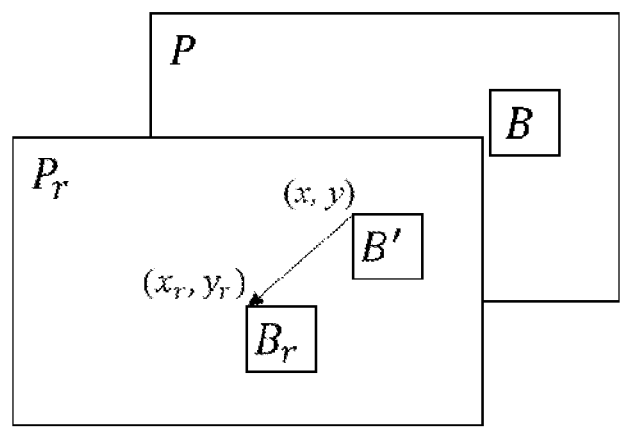
FIG. 2 is a schematic diagram of an inter-frame prediction mode according to an embodiment of this application.

As shown in FIG. 2, The inter-frame prediction is to predict a pixel of the current picture by using correlation of a time domain of a video and using a pixel of an adjacent encoded picture, so that the time domain redundancy of the video is effectively removed, thereby effectively saving bits for encoding residual data. P is a current frame, Pr is a reference frame, B is a current to-be-encoded block, and Br is a reference block of B. Coordinate positions of B' and B in the picture are the same, coordinates of Br are (xr, yr), and coordinates of B' are (x, y). A displacement between the current to-be-encoded block and the reference block is referred to as an MV, that is:

$$MV=(xr-x, yr-y).$$

Considering that time domain or space domain adjacent blocks have relatively strong correlation, an MV prediction technology may be used to further reduce bits required for encoding the MV. In H.265/HEVC, the inter-frame prediction mode includes two MV prediction technologies: a Merge mode and an advanced motion vector prediction (AMVP) mode.

The Merge mode may establish a candidate MV list for a current prediction unit (PU), where there are 5 candidate MVs (and corresponding reference pictures) in the list. The 5 candidate MVs are traversed, and a candidate MV with minimum rate-distortion cost is selected as an optimal MV. If an encoder establishes a candidate list in the same manner, the encoder only needs to transmit an index of the optimal MV in the candidate list. The MV prediction technology in HEVC further includes a skip mode, which is a special case of the Merge mode. After the optimal MV is found in the Merge mode, when the current block and the reference block are basically the same, residual data does not need to be transmitted, and only the index of the optimal MV and a skip flag need to be transmitted.

Figure 3:
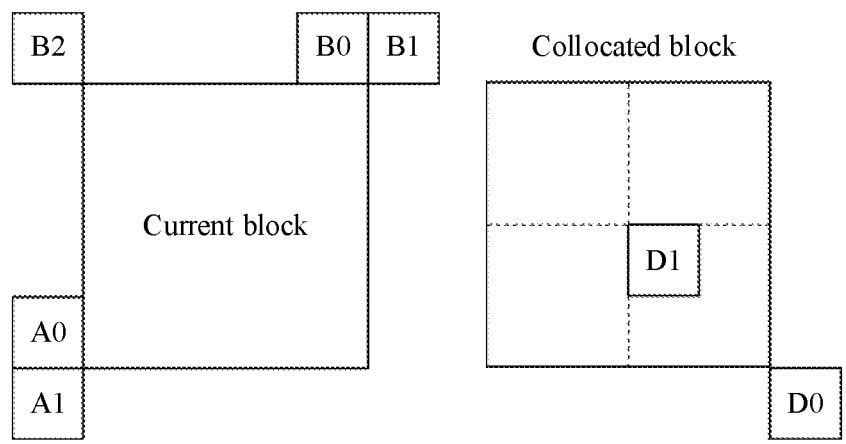
FIG. 3 is a schematic diagram of a candidate motion vector according to an embodiment of this application.

The MV candidate list established in the Merge mode includes two situations including a space domain and a time domain, and further includes a combined list for a B patch (a B-frame picture). The space domain provides 4 candidate MVs at most, and an establishment process is shown by a part (a) in FIG. 3. The space domain list is established according to a sequence A1→B1→B0→A0→B2, where B2 is a substitute. That is, when one or more of A1, B1, B0, and A0 does not exist, motion information of B2 needs to be used. The time domain only provides 1 candidate MV at most, and an establishment process is shown by a part (b) in FIG. 3 and is obtained through expansion of an MV of a collocated PU according to the following formula:

$$curMV=td*colMV/tb.$$

curMV represents an MV of the current PU, colMV represents the MV of the collocated PU, td represents a distance between the current picture and the reference picture, and tb represents a distance between a collocated picture and the reference picture. If a PU at a position D0 on a collocated block is unavailable, a collocated PU at a position D1 is used for replacement. For a PU in the B patch, because the PU includes two MVs, an MV candidate list thereof also needs to provide two motion vector predictors (MVPs). The HEVC combines first 4 candidate MVs in the MV candidate list in pairs, to generate a combined list for the B patch.

Similarly, the AMVP mode uses the MV correlation of space domain and time domain adjacent blocks, to establish an MV candidate list for the current PU. Different from the Merge mode, an optimal prediction MV is selected in the MV candidate list of the AMVP mode, and differential encoding is performed on the optimal prediction MV and an optimal MV obtained by the current to-be-encoded block through motion searching, namely, encoding is performed on MVD=MV−MVP, where MVD is a motion vector difference. A decoder side establishes a same list, so that an MV of a current decoded block may be calculated only requiring serial numbers of the MVD and the MVP in the list. The MV candidate list of the AMVP mode also includes two situations of a space domain and a time domain, and a difference lies in that a length of the MV candidate list of the AMVP mode is only 2.

History based motion vector prediction (HMVP) is a newly adopted MV prediction technology in H.266/VVC. HMVP is a motion vector prediction method based on historical information. Motion information of a historical encoded block is stored in an HMVP list and is used as an MVP of a current coding unit (CU). H.266/VVC adds HMVP to the candidate list of the Merge mode, which ranks after time domain and space domain MVPs. The HMVP technology stores motion information of previous encoded blocks using a first input first output (FIFO) queue. If stored candidate motion information and motion information that is just encoded are the same, the repeated candidate motion information is first removed, and all HMVP candidate motion information moves forward, and the motion information of the current CU is added to an end of the FIFO queue. If the motion information of the current CU is different from any candidate motion information in the FIFO queue, the latest motion information is added to the end of the FIFO queue. When new motion information is added to the HMVP list, when the list has reached the maximum length, the first candidate motion information in the FIFO queue is removed, and the latest motion information is then added to the end of the FIFO queue. The HMVP list may be reset (emptied) in a case of encountering a new coding tree unit (CTU) row. In H.266/VVC, a size S of an HMVP list is set to 6, to reduce a number of redundancy checking operations, and the following simplification manners are introduced:

1. A number of pieces of HMVP candidate motion information used for Merge list generation is set to (N<=4)?M: (8−N), where N represents a number of pieces of existing candidate motion information in the Merge list, and M represents a number of pieces of available HMVP candidate motion information in the Merge list.

2. Once an available length of the Merge list reaches a maximum allowed length minus one, a construction process for the combined candidate motion information list of HMVP is ended.

II. IBC Prediction Mode.

Figure 4:
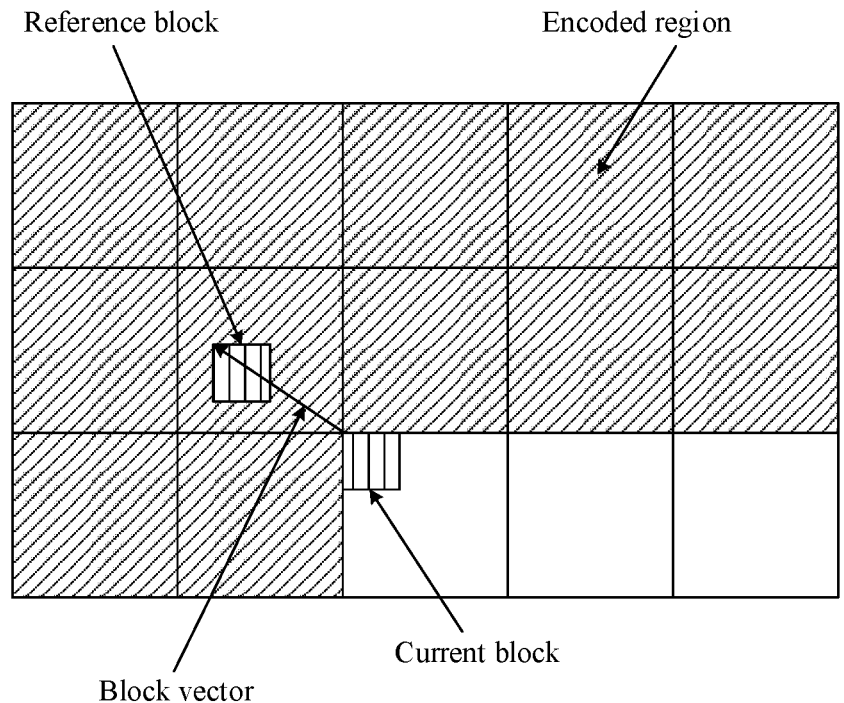
FIG. 4 is a schematic diagram of an intra block copy mode according to an embodiment of this application.

IBC is an intra-frame encoding tool adopted in screen content coding (SCC) expansion of HEVC, which significantly improves the efficiency of SCC. In AVS3 and VVC, the IBC technology is also adopted to improve the performance of SCC. The IBC technology predicts a pixel of a current to-be-encoded block by using correlation of a screen content video in space and using a pixel of an encoded picture on the current picture, so that bits required for encoding pixels can be effectively saved. As shown in FIG. 4, a displacement between a current and a reference block thereof in IBC is referred to as a BV. H.266/VVC adopts a BV prediction technology that is similar to intra-frame prediction to further save bits required for encoding BVs.

III. ISC Prediction Mode.

Figure 5:
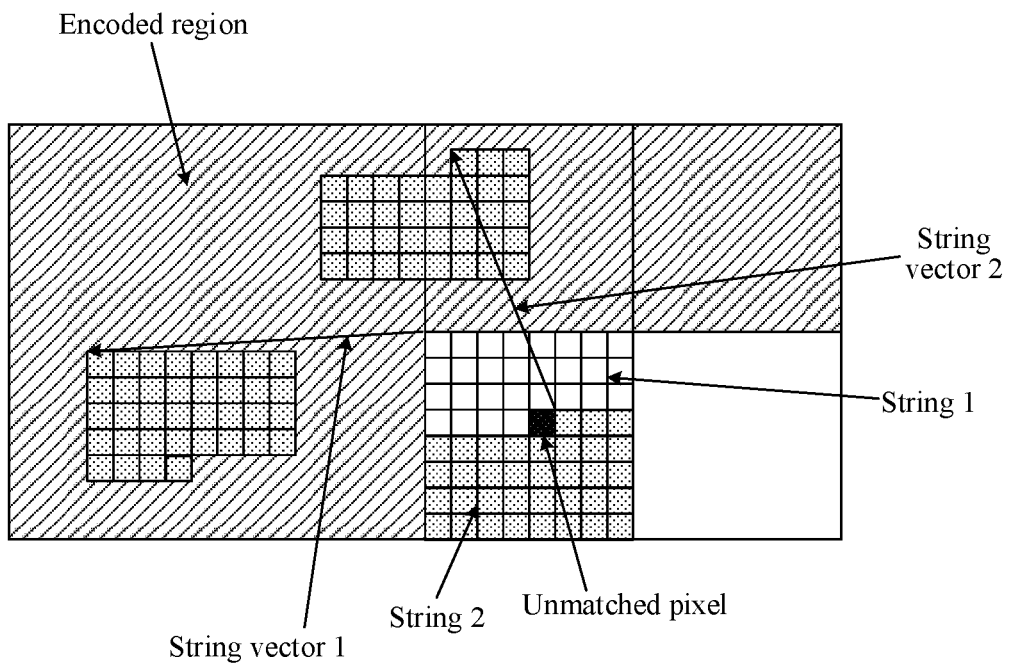
FIG. 5 is a schematic diagram of an intra string copy mode according to an embodiment of this application.

The ISC technology divides an encoded block into a series of pixel strings or unmatched pixels according to a scanning sequence (for example, raster scanning, reciprocating scanning, and Zig-Zag scanning). Similar to the IBC technology, a reference string in a same shape is searched in an encoded region of the current picture for each string, a prediction value of a current string is exported, and encoding is performed on a residue between a pixel value and the prediction value of the current string instead of being directly performed on the pixel value, so that bits can be effectively saved. FIG. 5 is a schematic diagram of ISC, where dark gray regions are encoded regions, 28 white pixels are a string 1, 35 light gray pixels are a string 2, and 1 black pixel represents an unmatched pixel. A displacement between the string 1 and a reference string thereof is an SV 1 in FIG. 5; and A displacement between the string 2 and a reference string thereof is an SV 2 in FIG. 5.

The ISC technology needs to encode an SV, a string length, and an identifier whether there is a matched string corresponding to each string in the current encoded block. The SV represents a displacement from a to-be-encoded string to a reference string thereof. The string length represents a number of pixels included in the string. In different implementations, encoding on the string length have many manners, and some examples (a part of the examples may be combined for use) are given below: 1) Encoding is directly performed on the string length in a bitstream. 2) Encoding processing is performed on a number of subsequent to-be-processed pixels of the string in a bitstream, and the decoder side calculates, according to a size N of the current block, a number N1 of processed pixels, and the number N2 of the to-be-processed pixels obtained through decoding, a length L of the current string, L=N−N1−N2. 3) Encoding is performed on an identifier indicating whether the string is the last string in a bitstream, when the string is the last string, according to the size of the current block N and the number N1 of processed pixels, the length L of the current string is calculated, L=N−N1. If a corresponding reference is not found in a reference region for a pixel, encoding is directly performed on a pixel value of the unmatched pixel.

IV. Intra-Frame MVP Prediction in AVS3.

IBC and ISC are two SCC tools in AVS3, which both use the current picture as a reference to export a prediction value of a CU through motion compensation. Considering that IBC and ISC include similar reference regions, and BV and SV include relatively high correlation, prediction between IBC and ISC may be allowed to further improve the encoding efficiency. AVS3 uses an intra-frame historical motion information prediction (IntraHMVP) list that is similar to HMVP to record MV information, position information, size information, and repetition times of the two types of encoded blocks, and export a block vector predictor (BVP) and a string vector predictor (SVP) through the IntraHMVP list. The BVP is a prediction value of a BV, and the SVP is a prediction value of an SV. To support parallel encoding, when a current LCU is a first LCU in a current row of a patch, a value of CntIntraHmvp in the IntraHMVP list is initialized to 0.

1. Export of BVP.

In AVS3, class based block vector prediction (CBVP) that is similar to HMVP is adopted. The method first uses a history based block vector prediction (HBVP) list to store information of historical IBC encoded blocks, and further records information such as positions and sizes of the historical encoded blocks in addition to recording BV information of the historical encoded blocks. For a current encoded block, candidate BVs in the HBVP list are classified according to the following conditions:

class 0: an area of the historical encoded block is greater than or equal to 64 pixels;
class 1: a frequency of the BV is greater than or equal to 2;
class 2: coordinates of an upper left corner of the historical encoded block is on the left of coordinates of an upper left corner of the current block;
class 3: the coordinates of the upper left corner of the historical encoded block is above the coordinates of the upper left corner of the current block;
class 4: the coordinates of the upper left corner of the historical encoded block is on an upper left side of the coordinates of the upper left corner of the current block;
class 5: the coordinates of the upper left corner of the historical encoded block is on an upper right side of the coordinates of the upper left corner of the current block; and
class 6: the coordinates of the upper left corner of the historical encoded block is on a lower left side of the coordinates of the upper left corner of the current block, where Instances in each class are arranged in a reverse sequence of an encoding sequence (the closer to the current block in the encoding sequence, the former the instance is ranked), and a BV corresponding to a first historical encoded block is a candidate BV corresponding to the class. The candidate BV corresponding to each class is then added to the CBVP list according to a sequence from the class 0 to the class 6. When a new BV is added to the CBVP list, whether a repeated BV already exists in the CBVP list needs to be checked. The BV is added to the CBVP list only when no repeated BV exists. The encoder side selects an optical candidate BV in the CBVP list as a BVP, and encodes an index in a bitstream to represent an index of a class corresponding to the optimal candidate BV in the CBVP list. The decoder side performs decoding to obtain the BVP from the CBVP list according to the index.

After the current PU is decoded, when a prediction type of the current PU is block copy intra-frame prediction (namely, IBC), when NumOfIntraHmvpCand is greater than 0, the IntraHMVP is updated according to block copy intra-frame prediction motion information of a current prediction block in a manner described below. The intra-frame prediction motion information of the current prediction block includes displacement vector information, position information, size information, and repetition times, where the displacement vector information of the current prediction block is a BV; the position information includes a horizontal coordinate and a vertical coordinate of an upper left corner of the current prediction block; the size information is a product of a width and a height; and the repetition times of the current prediction block is initialized to 0.

2. Export of SVP.

AVS3 encodes an index for each string in an ISC encoded block, to indicate a position of an SVP of the string in the IntraHMVP list. Similar to the skip mode in intra-frame prediction, an SV of a current string is equal to an SVP, and a residue between the SV and the SVP does not need to be encoded.

After the current PU is decoded, when a prediction type of the current PU is string copy intra-frame prediction (namely, ISC), when NumOfIntraHmvpCand is greater than 0, the IntraHMVP is updated according to string copy intra-frame prediction motion information of the current prediction block in a manner described below. The string copy intra-serial frame prediction motion information of the current prediction block includes displacement vector information, position information, size information, and repetition times, where the displacement vector information of a current string is an SV; the position information includes a horizontal coordinate and a vertical coordinate of a first pixel sample of the string, namely, (xi, yi); the size information is a string length of the part, namely, StrLen[i]; and the repetition times is initialized to 0.

3. Update of IntraHMVP List.

The intra-frame prediction motion information includes displacement vector information, position information, size information, and repetition times. After the current PU is decoded, when a prediction type of the current PU is block copy intra-frame prediction or string copy intra-frame prediction, when NumOfIntraHmvpCand is greater than 0, according to the intra-frame prediction motion information of the current prediction block, the IntraHmvpCandidateList is updated, and displacement vector information, position information, size information, and repetition times of IntraHmvpCandidateList[X] is respectively denoted as intraMvCandX, posCandX, sizeCandX, and cntCandX. Otherwise, operation defined by this condition are not performed.

a) X is initialized to 0, and cntCur is initialized to 0.

b) when CntIntraHmvp is equal to 0, IntraHmvpCandidateList[CntIntraHmvp] is the intra-frame prediction motion information of the current PU, and CntIntraHmvp is increased by 1.

c) otherwise, whether the intra-frame prediction motion information of the current prediction block is equal to IntraHmvpCandidateList[X] is determined according to whether intraMvCur is equal to intraMvCandX:
  1) when intraMvCur is equal to intraMvCandX, step d) is performed, or otherwise, X is increased by 1.
  2) when X is less than CntIntraHmvp, step c) is performed; or otherwise, step e) is performed.

d) a value of cntCur is equal to a value obtained by increasing a value of cntCandX by 1. If sizeCur is less than sizeCandX, sizeCur is equal to sizeCandX respectively at present.

e) when X is less than CntIntraHmvp:
  1) i ranges from X to CntIntraHmvp−1, to cause IntraHmvpCandidateList[i] to be equal to IntraHmvpCandidateList[i+1]; and
  2) IntraHmvpCandidateList[CntIntraHmvp−1] is equal to the intra-frame prediction motion information of the current PU.

f) otherwise, when X is equal to CntIntraHmvp and CntIntraHmvp is equal to NumOfIntraHmvpCand:
  1) i ranges from 0 to CntIntraHmvp−1, to cause IntraHmvpCandidateList[i] to be equal to IntraHmvpCandidateList[i+1]; and 2) IntraHmvpCandidateList[CntIntraHmvp−1] is equal to the intra-frame prediction motion information of the current PU.

g) otherwise, when X is equal to CntIntraHmvp and CntIntraHmvp is less than NumOfIntraHmvpCand, IntraHmvpCandidateList[CntIntraHmvp] is equal to the intra-frame prediction motion information of the current PU, and CntIntraHmvp is increased by 1.

In the existing AVS3 standard, a maximum length of the IntraHMVP is 12, and when an IntraHMVP in a first LCU in a current row is reset to empty, the IntraHMVP is updated using motion information included in an encoded/decoded IBC or ISC encoding unit. When the IntraHMVP is not filled up, sufficient prediction displacement vectors cannot be provided. In addition, when the length of the IntraHMVP is 0, indexes of extra encoding displacement vectors are still required, but effective prediction displacement vectors cannot be provided, which brings adverse impact on the encoding efficiency.

This application provides a method for constructing a motion information list. When motion information is insufficient, this method provides extra motion information for the motion information list, to achieve a better displacement vector prediction effect, thereby improving the video compression performance.

Figure 6:
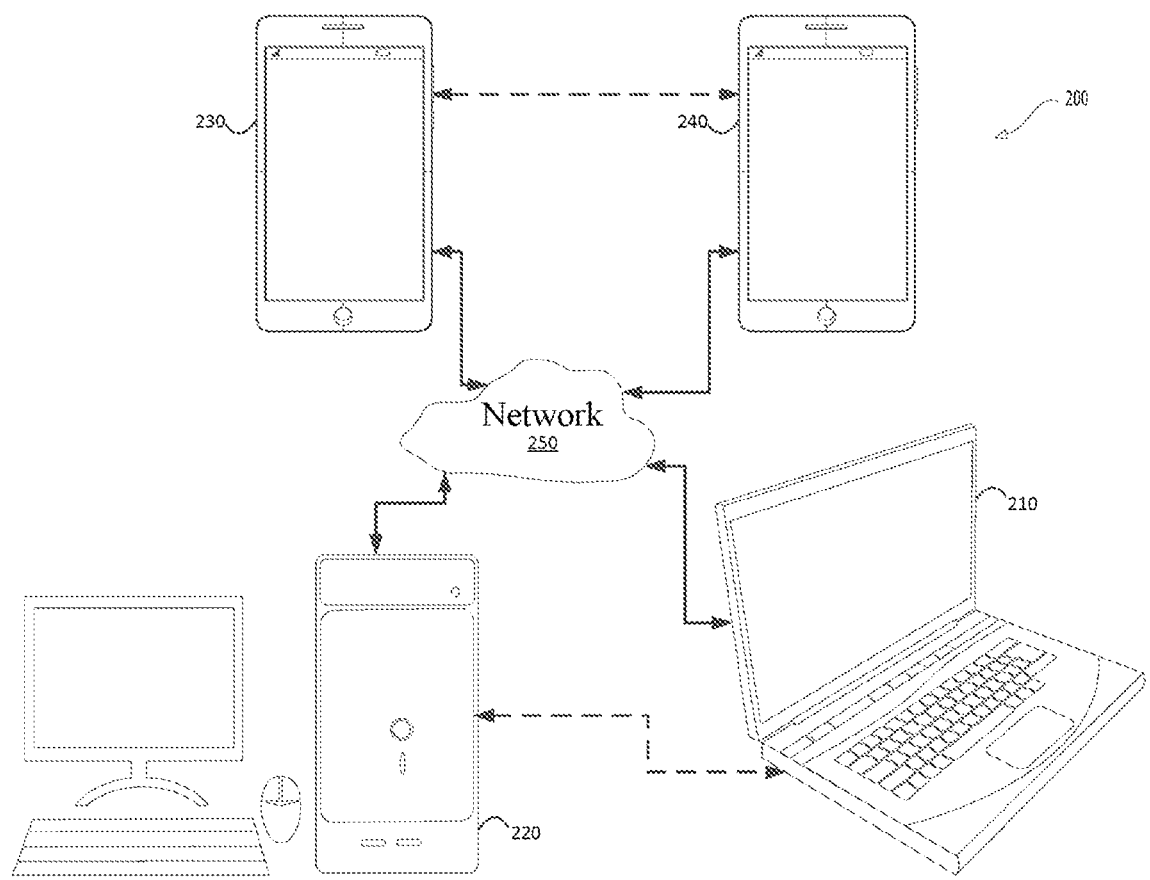
FIG. 6 is a simplified block diagram of a communication system according to an embodiment of this application.

FIG. 6 is a simplified block diagram of a communication system according to an embodiment of this application. The communication system 200 includes a plurality of devices, and the devices may communicate with each other through, for example, a network 250. For example, the communication system 200 includes a first device 210 and a second device 220 that are interconnected through the network 250. In the embodiment of FIG. 6, the first device 210 and the second device 220 perform unidirectional data transmission. For example, the first device 210 may perform encoding on video data, for example, a video picture stream acquired by the first device 210 to transmit the video data to the second device 220 through the network 250. Encoded video data is transmitted in the form of one or more encoded video bitstreams. The second device 220 may receive the encoded video data from the network 250, perform decoding on the encoded video data to restore the video data, and display a video picture according to the restored video data. The unidirectional data transmission is quite common in applications such as media service.

In another embodiment, the communication system 200 includes a third device 230 and a fourth device 240 performing bidirectional transmission of encoded video data, and for example, the bidirectional transmission may occur during a video conference. For bidirectional data transmission, each device in the third device 230 and the fourth device 240 may perform encoding on video data (for example, a video picture stream acquired by the device), to transmit the video data to the other device in the third device 230 and the fourth device 240 through the network 250. Each device in the third device 230 and the fourth device 240 may further receive encoded video data transmitted by the other device in the third device 230 and the fourth device 240, perform decoding on the encoded video data to restore the video data, and display a video picture on an accessible display apparatus according to the restored video data.

In the embodiment of FIG. 6, the first device 210, the second device 220, the third device 230, and the fourth device 240 may all be computer devices such as servers, personal computers, or smartphones, but the principle disclosed in this application is not limited thereto. The embodiments of this application are applicable to a personal computer (PC), a mobile phone, a tablet computer, a media player, and/or a dedicated video conference device. The network 250 represents any number of networks that transmit encoded video data among the first device 210, the second device 220, the third device 230, and the fourth device 240, including a wired and/or wireless communication network. The communication network 250 may exchange data in a circuit switching and/or packet switching channel. The network may include a telecommunication network, a local area network, a wide area network, and/or the Internet. For the purpose of this application, unless otherwise explained in the following description, the architecture and topology of the network 250 are unnecessary for operations disclosed in this application.

Figure 7:
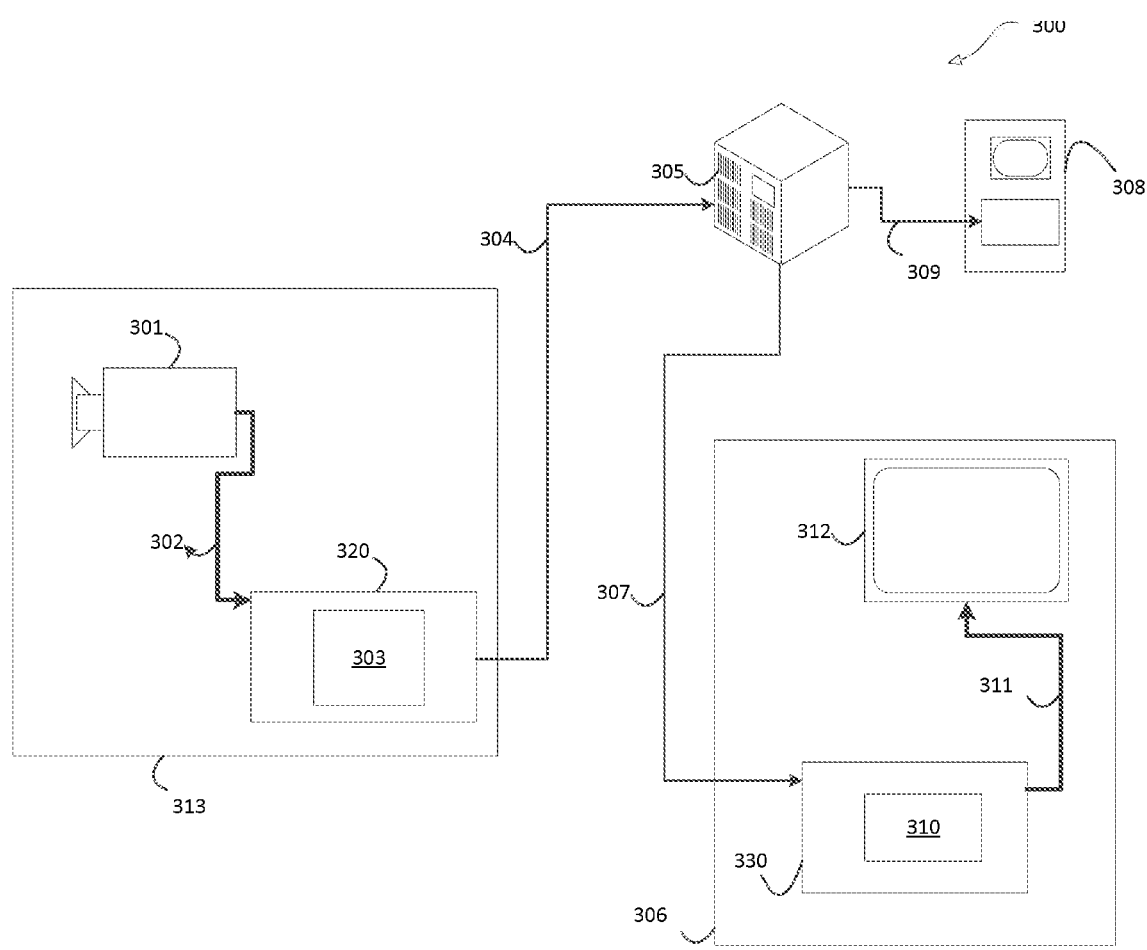
FIG. 7 is a schematic exemplary diagram of a placement manner of a video encoder and a video decoder in a streaming transmission environment according to this application.

In an embodiment, FIG. 7 shows a placement manner of a video encoder and a video decoder in a streaming transmission environment. A subject disclosed in this application may be equally applicable to other applications supporting videos, including a video conference, a digital television (TV), and compressed videos stored on a digital medium such as a compact disc (CD), a digital versatile disc (DVD), and a memory stick.

A streaming transmission system may include an acquisition subsystem 313, the acquisition subsystem may include a video source 301 such as a digital camera, and the video source creates a video picture stream 302 that is not compressed. In an embodiment, the video picture stream 302 includes samples taken by the digital camera. Compared with encoded video data 304 (or an encoded video bitstream), the video picture stream 302 is described as a video picture stream highlighting a high data amount through a bold line, the video picture stream 302 may be processed by an electronic device 320, and the electronic device 320 includes a video encoder 303 coupled to the video source 301 The video encoder 303 may include hardware, software, or a combination of hardware and software to implement or perform various aspects of the subject disclosed and described in a more detailed manner in the following description. Compared with the video picture stream 302, the encoded video data 304 (or an encoded video bitstream 304) is described as encoded video data 304 (or an encoded video bitstream 304) highlighting a low data amount through a fine line, which may be stored on a streaming transmission server 305 for future use. One or more streaming transmission client sub-systems, for example, a client sub-system 306 and a client sub-system 308 in FIG. 7, may access the streaming transmission server 305 to retrieve a copy 307 and a copy 309 of the encoded video data 304. The client sub-system 306 may include, for example, a video decoder 310 in an electronic device 330. The video decoder 310 performs decoding on the inputted copy 307 of the encoded video data, and generate an outputted video picture stream 311 that may be presented on a display 312 (for example, a display screen) or another presentation apparatus (not depicted herein). In some streaming transmission systems, encoding may be performed on the encoded video data 304, video data 307, and video data 309 (for example, a video bitstream) according to some video encoding/compression standards.

The electronic device 320 and the electronic device 330 may include other components (not shown). For example, the electronic device 320 may include a video decoder (not shown), and the electronic device 330 may further include a video encoder (not shown). The video decoder is configured to perform decoding on received encoded video data; and the video decoder is configured to perform decoding on the video data.

The technical solution provided in the embodiments of this application may be applicable to the H.266/VVC standard, the H.265/HEVC standard, AVS (for example, AVS3), or next-generation video encoding and decoding standards, which is not limited in the embodiments of this application.

Further, an execution entity of the steps of the method provided in the embodiments of this application may be a decoder side device or may be an encoder side device. The technical solution provided in the embodiments of this application may be adopted in processes of both video decoding and video encoding, to construct a motion information list. The decoder side device and the encoder side device both may be a computer device, and the computer device is an electronic device having data computing, processing, and storage capabilities, such as a PC, a mobile phone, a tablet computer, a media player, a dedicated video conference device, or a server.

In addition, the method provided in this application may be used independently or may be combined with another method is any sequence. The encoder or the decoder based on the method provided in this application may be implemented through one or more processors or one or more integrated circuits. The technical solutions of this application are described by using several embodiments below.

Figure 8:
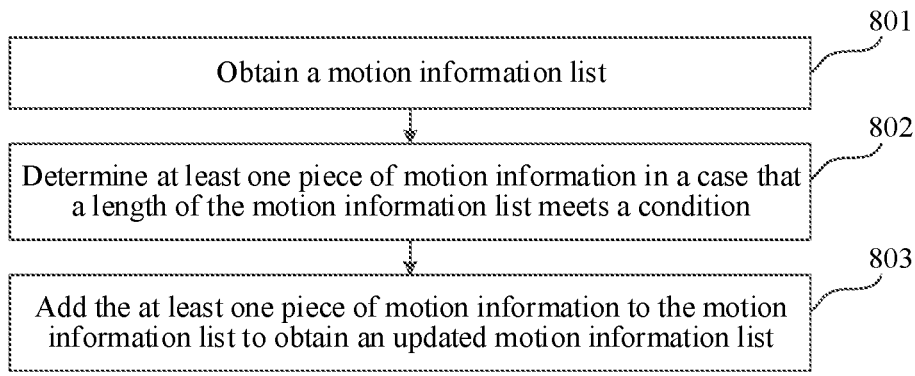
FIG. 8 is a flowchart of a method for constructing a motion information list in video encoding and decoding according to an embodiment of this application.

FIG. 8 is a flowchart of a method for constructing a motion information list in video encoding and decoding according to an embodiment of this application. For ease of description, the description is provided by only using a computer device as the execution entity of the steps. The method may include the following steps (801 and 803):

Step 801: Obtain a motion information list.

In the embodiments of this application, the motion information list is a list used for recording and indexing motion information. The motion information includes a displacement vector, such as the MV of the inter-frame prediction mode, the BV of the IBC prediction mode, and the SV of the ISC prediction mode described above.

In some embodiments, the motion information list is an initial motion information list. The initial motion information list refers to a motion information list constructed during initialization. In an example, the initial motion information list is empty, namely, no motion information is included or a number of pieces of included motion information is 0. In another example, the initial motion information list is not empty, namely, includes one or more pieces of motion information.

In an exemplary embodiment, the initial motion information list refers to a motion information list constructed during initialization when encoding (or decoding) starts to be performed on each CTU row in a picture; or the initial motion information list refers to a motion information list constructed during initialization when encoding (or decoding) starts to be performed on each patch in a picture.

In the embodiments of this application, a picture refers to one frame or one field in a video. One picture may be partitioned into a plurality of CTU rows, and each CTU row may include one or more CTUs. In addition, one picture may also be partitioned into a plurality of patches, where a patch refers to a plurality of adjacent LCUs arranged according to a raster scanning sequence, and one patch may include one or more CTUs. In a possible embodiment, when encoding (or decoding) starts to be performed on each CTU row in a picture, or when encoding (or decoding) starts to be performed on each patch in a picture, the motion information list may be reset, namely, the motion information list constructed during initialization is empty.

In addition, in some other examples, the motion information list may not be a motion information list constructed during initialization. For example, the motion information list may be a motion information list obtained in a process that encoding (or decoding) is performed on each CTU row in a picture; or the motion information list may also be a motion information list obtained in a process that encoding (or decoding) is performed on each patch in a picture.

Step 802: Determine at least one piece of motion information when a length of the motion information list meets a condition.

The length of the motion information list refers to a number of pieces of motion information included in the motion information list. After the motion information list is obtained by a computer device, the length of the motion information list is further determined. As motion information is added to or removed from the motion information list, the length of the motion information list also changes correspondingly. For example, when one piece of motion information is added to the motion information list, the length of the motion information list is increased by 1; and when one piece of motion information is removed from the motion information list, the length of the motion information list is decreased by 1.

In some embodiments, a length of the motion information list meeting a condition refers to that the length of the motion information list is less than or equal to a target value. That is, when the length of the motion information list is less than or equal to the target value, at least one piece of motion information is determined.

In some embodiments, the determining at least one piece of motion information refers to determining at least one piece of motion information from an external source of the motion information list.

In an example, the condition is that the length of the motion information list is 0, namely, the motion information list is empty. That is, when the length of the motion information list is equal to 0, at least one piece of motion information is determined from the external source of the motion information list. When the length of the motion information list is 0, after determining that the length of the motion information list meets the condition, the motion information list is updated by performing the following steps.

In another example, the condition is that the length of the motion information list is less than a maximum length. The maximum length refers to a number of pieces of motion information that is allowed to be included in the motion information list. That is, when the length of the motion information list is less than the maximum length, at least one piece of motion information is determined from the external source of the motion information list. For example, when it is assumed that the maximum length of the motion information list is N, it indicates that the number of pieces of motion information that is allowed to be included in the motion information list is N, and N is a positive integer. When the length of the motion information list is less than the maximum length, after determining that the length of the motion information list meets the condition, the motion information list is updated by performing the following steps.

In another example, the condition is that the length of the motion information list is less than a preset threshold. In some embodiments, the preset threshold is less than the maximum length of the motion information list. That is, when the length of the motion information list is less than the preset threshold, at least one piece of motion information is determined from the external source of the motion information list. For example, when it is assumed that the maximum length of the motion information list is 6, the preset threshold may be 2. The preset threshold may be defined in a standard or protocol or may be indicated to a decoder side by an encoder side in a bitstream, which is not limited in the embodiments of this application. When the length of the motion information list is less than the preset threshold, after determining that the length of the motion information list meets the condition, the motion information list is updated by performing the following steps.

In addition, the determined at least one piece of motion information refers to motion information to be added to the motion information list, to update the motion information list. Besides, the at least one piece of motion information is obtained from the external source of the motion information list, namely, the at least one piece of motion information obtained from another place outside the motion information list is used for filling the motion information list. The at least one piece of motion information may be preset (for example, predefined in a standard or protocol), or may be determined in another manner. For details, reference may be made to the description in the following embodiments.

Step 803: Add the at least one piece of motion information to the motion information list to obtain an updated motion information list.

In an example, duplication checking and comparison is not performed, and the at least one piece of motion information is directly added to the motion information list. For example, when the motion information list is empty, the at least one piece of motion information may be directly added to the motion information list without duplication checking and comparison; or even if when the motion information list is not empty, the at least one piece of motion information may also be directly added to the motion information list without duplication checking and comparison.

In another example, duplication checking and comparison is performed on to-be-added motion information and motion information already existing in the motion information list; and the motion information list is updated according to a duplication checking and comparison result to obtain the updated motion information list. For example, when the to-be-added motion information is the same as motion information (denoted as target motion information) already existing in the motion information list, it indicates that there is duplication, the computer device may add the to-be-added motion information to the list after deleting the target motion information from the list, or may not add the to-be-added motion information to the list. In some embodiments, motion information is added to the motion information list one by one, and duplication checking and comparison is performed on each piece of added motion information and the motion information already existing in the list. Alternatively, it is assumed that a current length of the motion information list is L, duplication checking and comparison is performed on each piece of added motion information and first L items in the current motion information list, so that motion information added during general updating is not repeated. Alternatively, similar to a duplication checking manner of a candidate block vector list, duplication checking and comparison is only performed displacement vectors whose classes are 0 and 1. Certainly, the duplication checking and comparison manner described above is only exemplary and explanatory, and the embodiments of this application are not limited thereto and may further adopt other manners.

In some embodiments, when the to-be-added motion information is added to the motion information list, the to-be-added motion information may be added to the list from an end of the motion information list according to a first input first output (FIFO) principle.

Based on the above, according to the technical solution provided in the embodiments of this application, by filling the motion information list using the extra motion information when the motion information included in the motion information list is insufficient, the motion information list is updated, so that more displacement vectors that are more effective are provided in the motion information list to achieve a better displacement vector prediction effect, thereby improving the video compression performance.

In addition, by adopting the technical solution of this application, initialization updating can be performed on the initial motion information list, and the list is filled using the extra motion information, so that more displacement vectors that are more effective are provided in the initial motion information list.

In an exemplary embodiment, the decoder side is used as an example, export of a prediction displacement vector may include the following 3 steps:

1. A historical motion information list is used to record motion information of historical PUs (for example, decoded blocks or decoded strings) in a decoding process in a FIFO manner.

2. When decoding is performed on a displacement vector of a current PU (for example, a current block or a current string), a candidate motion information list is exported according to the historical motion information list in combination with other motion information.

3. A position (or referred to as an index) of a prediction displacement vector of the current PU in the candidate motion information list is obtained from a bitstream, and the prediction displacement vector of the current PU is exported.

In the embodiments of this application, a historical PU refers to an encoded (or decoded) picture unit, where the picture unit may include one or more pixels, and the picture unit may be in a shape of a block or a string. For the inter-frame prediction mode and the IBC prediction mode, the historical PU is also referred to as a historical block, which refers to an encoded (or decoded) picture block. For the ISC prediction mode, the historical PU is also referred to as a historical string, which refers to an encoded (or decoded) picture string.

A current PU refers to a currently encoded (or decoded) picture unit, where the picture unit may similarly include one or more pixels, and the picture unit may be in a shape of a block or a string.

This application provides a method for constructing a motion information list. When motion information is insufficient, this method can provide extra motion information for the motion information list, and the following two methods are included: a method 1 is to fill the historical motion information list in the foregoing step 1, and a method 2 is to fill the candidate motion information list in the foregoing step 2, where the two methods may be used independently or may be combined.

In this embodiment, the method 1 is described below. The motion information list is a historical motion information list, and the historical motion information list is used for recording historical motion information.

In some embodiments, the motion information list is an initial historical motion information list, namely, a historical motion information list constructed during initialization.

In an example, when encoding or decoding starts to be performed on each CTU row in a picture, the initial historical motion information list is obtained, and at least one piece of motion information is then used to perform initialization updating on the initial historical motion information list.

In another example, when encoding or decoding starts to be performed on each patch in a picture, the initial historical motion information list is obtained, and at least one piece of motion information is then used to perform initialization updating on the initial historical motion information list.

In some embodiments, the initial historical motion information list is empty. When initialization updating is performed on the initial historical motion information list, a number of pieces of motion information added to the list may be equal to a maximum length of the historical motion information list or may be less than the maximum length of the historical motion information list.

Certainly, in some other examples, the historical motion information list may not be a historical motion information list constructed during initialization. For example, the historical motion information list may be a historical motion information list obtained in a process that encoding (or decoding) is performed on each CTU row in a picture; or the historical motion information list may also be a historical motion information list obtained in a process that encoding (or decoding) is performed on each patch in a picture.

In some embodiments, when the historical motion information list is filled, determined to-be-added motion information includes at least one of the following:
1. Motion information included in the historical motion information list after a target CTU is encoded or decoded.

For example, the target CTU may be a CTU in a former CTU row of a CTU row in which a current unit is located, such as a first CTU in the former CTU row; or the target CTU may also be a CTU in a former patch of a patch in which the current unit is located, such as a first CTU in the former patch.

For example, for the encoder side, the encoder side may record a historical motion information list after the target CTU is encoded, and then use motion information in the recorded historical motion information list to update the historical motion information list.

In another example, for the decoder side, the decoder side may record a historical motion information list after the target CTU is decoded, and then use motion information in the recorded historical motion information list to update the historical motion information list.

2. Motion information included in a sequence header or a picture header.

In this example, the encoder side may add some motion information used for filling the historical motion information list to a sequence header or a picture header, and the decoder side then obtains the motion information used for filling from the sequence header or the picture header through decoding.

In some standards, a picture sequence is also referred to as a video sequence, which is a top-level syntactic structure of an encoding bitstream and includes one or a plurality of continuous pictures. A sequence header of a picture sequence includes some related information used for decoding the picture sequence. A picture header of a picture includes some related information used for decoding the picture.

3. At least one piece of preset motion information.

In some embodiments, the preset motion information may be predefined in a standard or protocol.

In some embodiments, the preset motion information includes a displacement vector. The displacement vector includes at least one of the following: (0, 0), (−w, 0), (−2*w, 0), (0, −h), (0, −2*h), (−w, −h), (−w, −2*h), (−2*w, −h), or (−2*w, −2*h), where w is a width of a minimum encoding and decoding unit, and h is a height of the minimum encoding and decoding unit. In some embodiments, the minimum encoding and decoding unit in this specification refers to a CU in a minimum size allowed by an encoder or decoder, namely, the width of the minimum encoding and decoding unit refers to a minimum width of the CU allowed by the encoder or decoder, and the height of the minimum encoding and decoding unit refers to a minimum height of the CU allowed by the encoder or decoder.

In some embodiments, the preset motion information further includes at least one of position information, size information, or repetition times corresponding to a displacement vector. In some embodiments, when the historical motion information list is a class-based historical motion information list such as the HBVP described above, the position information, the size information, and the repetition times corresponding to the displacement vector may affect a class to which the displacement vector belongs.

In some embodiments, the preset motion information further includes position information. It is assumed that coordinates of an upper left corner of the current CTU are (x, y), a width of the picture is pic_w, a height of the picture is pic_h, a width of the current CTU is ctu_w, and a height of the current CTU is ctu_h. The position information includes at least one of the following:
(1) coordinates of a pixel of a left boundary of the picture, where a horizontal coordinate is 0 and a value range of a vertical coordinate is [0, pic_h−1]);
(2) coordinates of a pixel of an upper boundary of the picture, where a value range of a horizontal coordinate is [0, pic_w−1] and a vertical coordinate is 0;
(3) coordinates of a pixel of a left boundary of a current CTU row, where a horizontal coordinate is 0 and a value range of a vertical coordinate is [y, y+ctu_h−1]);
(4) coordinates of a pixel of an upper boundary of a current CTU row, where a value range of a horizontal coordinate is [0, pic_w−1] and a vertical coordinate is y;
(5) coordinates of a pixel of a left boundary of the current CTU, where a horizontal coordinate is x and a value range of a vertical coordinate is [y, y+ctu_h−1]); or
(6) coordinates of a pixel of an upper boundary of the current CTU, where a value range of a horizontal coordinate is [x, x+ctu_w−1] and a vertical coordinate is y.

In some embodiments, the preset motion information includes size information. In some embodiments, a value of the size information is less than or equal to a first threshold. For example, the first threshold may be a threshold corresponding to a class 0 in candidate BV classes in HBVP, namely, the first threshold is 64 pixels. In an example, the value of the size information is set to be a size of a minimum coding unit (namely, CU).

In some embodiments, the preset motion information includes a repetition times. In some embodiments, a value of the repetition times is less than or equal to a second threshold. For example, the second threshold may be a threshold corresponding to a class 1 in candidate BV classes in HBVP, namely, the second threshold is 2. In an example, the value of the repetition times is initialized to 0.

In the embodiments of this application, by setting information such as the position information, the size information, and the repetition times corresponding to the displacement vector in the preset motion information, a class to which the preset motion information belongs can be controlled. Therefore, the preset motion information is classified into a suitable class, and a suitable position is reserved for motion information subsequently added to the list, thereby helping improve the encoding and decoding performance. For example, by limiting the value of the size information to be less than or equal to the first threshold, or limiting the value of the repetition times to be less than or equal to the second threshold, the preset motion information may not occupy the class 0 and the class 1 but occupy some classes having a lower priority, so that a suitable position is reserved for motion information subsequently added to the list.

In some embodiments, a maximum length of the historical motion information list is N, and N is a positive integer. The updating the historical motion information list includes adding M pieces of motion information to an end of the historical motion information list, where M is a positive integer less than or equal to N. For example, the maximum length of the historical motion information list is 7, and the updating the historical motion information list includes adding 2 pieces of motion information to the end of the historical motion information list. One piece of motion information includes a displacement vector (−w, 0), position information (0, 0), size information 8*8, and a repetition times 0, and the other piece of motion information includes a displacement vector (0, −h), position information (0, 0), size information 4*4, and a repetition times 0.

In addition, when the preset motion information is used to fill the historical motion information list, (0, 0) may be directly filled. In an example, it is assumed that the maximum length of the historical motion information list is N, a current length of the list is M (M is less than N), and the historical motion information list is filled up using preset displacement vectors, then M-N displacement vectors may be filled in the historical motion information list, and the M-N displacement vectors are all (0, 0).

In addition, when the historical motion information list is updated, duplication checking and comparison may be performed. For example, when initialization updating is performed on the initial historical motion information list, duplication checking and comparison may be performed.

Based on the above, in this embodiment, when motion information included in the historical motion information list is insufficient, the list is filled using extra motion information, to perform additionally filling on the historical motion information list, so that more candidate displacement vectors that are more effective can be provided.

In this embodiment, the method 2 is described below. The motion information list is a candidate motion information list, and the candidate motion information list is used for providing a candidate prediction displacement vector.

In an example, at least one piece of motion information is used to update the candidate motion information list when a length of the candidate motion information list is less than a threshold. In some embodiments, filling the candidate motion information list using the at least one piece of motion information is for an initial candidate motion information list, to perform initialization updating on the candidate motion information list.

In some embodiments, the threshold value is a maximum length of the candidate motion information list. For example, it is assumed that the maximum length of the candidate motion information list is 4, when the length of the candidate motion information list is less than 4, extra motion information is used to fill the candidate motion information list.

In some embodiments, the threshold value is less than the maximum length of the candidate motion information list. For example, it is assumed that the maximum length of the candidate motion information list is 4, the threshold value may be set to 2, and when the length of the candidate motion information list is less than 2, extra motion information is used to fill the candidate motion information list.

In some embodiments, when the candidate motion information list is filled, determined to-be-added motion information includes at least one of the following:

1. Motion information included in a sequence header or a picture header.

In this example, the encoder side may add some motion information used for filling the candidate motion information list to a sequence header or a picture header, and the decoder side then obtains the motion information used for filling from the sequence header or the picture header through decoding.

2. At least one piece of preset motion information.

In some embodiments, the preset motion information may be predefined in a standard or protocol.

In some embodiments, the preset motion information includes a displacement vector. The displacement vector includes at least one of the following: (0, 0), (−w, 0), (−2*w, 0), (0, −h), (0, −2*h), (−w, −h), (−w, −2*h), (−2*w, −h), or (−2*w, −2*h).

In an example, w is a width of the current encoding and decoding unit, and h is a height of the current encoding and decoding unit. In this specification, the current encoding and decoding unit refers to a CU that is currently encoded or decoded. That is, the width of the current encoding and decoding unit refers to a width of the CU that is currently encoded or decoded, and the height of the current encoding and decoding unit refers to a height of the CU that is currently encoded or decoded.

In another example, w is a width of a minimum encoding and decoding unit, and h is a height of the minimum encoding and decoding unit. The minimum encoding and decoding unit in this specification refers to a CU in a minimum size allowed by the encoder or decoder, namely, the width of the minimum encoding and decoding unit refers to a minimum width of the CU allowed by the encoder or decoder, and the height of the minimum encoding and decoding unit refers to a minimum height of the CU allowed by the encoder or decoder.

Two setting manners of displacement vectors included in the preset motion information are described above. A preset displacement vector that is set based on the width and the height of the current encoding and decoding unit has relatively high accuracy. A preset displacement vector that is set based on the width and the height of the minimum encoding and decoding unit has relatively low complexity, so that a codec does not need to dynamically adjust a preset displacement vector for each encoding and decoding unit.

In addition, when the candidate motion information list is filled using a preset displacement vector, (0, 0) may be directly filled. In an example, it is assumed that the maximum length of the candidate motion information list is 7, a current length of the list is 4, and the candidate motion information list is filled up using preset displacement vectors, then 3 displacement vectors may be filled in the candidate motion information list, and the 3 displacement vectors are all (0, 0).

3. Motion information exported from another historical motion information list, where the other motion historical motion information list includes a historical motion information list of an encoding and decoding unit adopting a prediction mode different from that of the current encoding and decoding unit.

If there are a plurality of historical motion information lists, motion information exported from another historical motion information list that is not empty may be used to fill the candidate motion information list whose motion information is currently insufficient. For example, when the candidate motion information list is used for providing a prediction displacement vector of an IBC prediction mode or an ISC prediction mode, the other historical motion information list includes a historical motion information list corresponding to an inter-frame prediction mode. In another example, when the candidate motion information list is used for providing a prediction displacement vector of an inter-frame prediction mode, the other historical motion information list includes a historical motion information list corresponding to an IBC prediction mode or an ISC prediction mode.

In an example, there are two historical motion information lists, where one historical motion information list is used for recording motion information of historical units of the inter-frame prediction mode, which is referred to as an HMVP list; and the other historical motion information list is used for recording motion information of historical units of the IBC prediction mode and the ISC prediction mode, which is referred to as an IntraHMVP list. When candidate displacement vectors of the IBC prediction mode and the ISC prediction mode are exported, when displacement vectors in candidate motion information lists corresponding to the IBC prediction mode and the ISC prediction mode are insufficient, displacement vectors in the HMVP list may be used to fill the candidate motion information lists.

4. Motion information of a space adjacent unit of the current encoding and decoding unit.

The space adjacent unit of the current encoding and decoding unit refers to a picture unit that is adjacent to the current encoding and decoding unit in space positions, such as an edge or a vertex overlapping with that of the current encoding and decoding unit.

In some embodiments, when the prediction mode of the current encoding and decoding unit is an IBC prediction mode or an ISC prediction mode, the space adjacent unit includes a space adjacent unit adopting the IBC prediction mode or the ISC prediction mode. For example, when the prediction mode of the current encoding and decoding unit is the IBC prediction mode, the space adjacent unit includes a space adjacent unit adopting the IBC prediction mode, or a space adjacent unit adopting the ISC prediction mode, or space adjacent units adopting the IBC prediction mode and the ISC prediction mode. In another example, when the prediction mode of the current encoding and decoding unit is the ISC prediction mode, the space adjacent unit includes a space adjacent unit adopting the ISC prediction mode, or a space adjacent unit adopting the IBC prediction mode, or a space adjacent unit adopting the ISC prediction mode and a space adjacent unit adopting the IBC prediction mode.

In some embodiments, when the prediction mode of the current encoding and decoding unit is the inter-frame prediction mode, the space adjacent unit includes a space adjacent unit adopting the inter-frame prediction mode.

According to the foregoing manner, motion information adopting a same or similar prediction mode is used to perform list filling, which helps improve the effectiveness of the displacement vectors filled in the candidate motion information list, thereby improving the encoding performance.

In addition, the space adjacent unit of the current encoding and decoding unit may include one or more CUs, each of the CUs may include one or more PUs (for example, encoding and decoding blocks or encoding and decoding strings), and the displacement vectors added to the candidate motion information list may be displacement vectors of all or some of PUs in the space adjacent unit, such as a displacement vector of a PU that is closest to the current encoding and decoding unit.

5. Motion information determined based on information recorded in a historical unit list, where the historical unit list records information of at least one historical encoding and decoding unit.

In an exemplary embodiment, a historical unit list may be constructed, and information of a historical encoding and decoding unit is recorded through the historical unit list. In some embodiments, the information of the historical encoding and decoding includes, but not limited to, at least one of the following: position coordinates of the historical encoding and decoding unit, size information of the historical encoding and decoding unit, or a displacement vector of the historical encoding and decoding unit. In this specification, the historical encoding and decoding unit refers to an encoded or decoded CU.

For example, it is assumed that the historical unit list includes a historical encoding and decoding unit whose coordinates are (xi, yi). When the prediction mode of the current encoding and decoding unit is the IBC prediction mode and coordinates of an upper left corner of the current encoding and decoding unit are (x, y), the motion information determined based on the information recorded in the historical unit list includes a displacement vector (xi−x, yi−y), and the displacement vector (xi−x, yi−y) is filled in the candidate motion information list. When the prediction mode of the current encoding and decoding unit is the ISC prediction mode and coordinates of a first pixel of a current string in the current encoding and decoding unit are (x, y), the motion information determined based on the information recorded in the historical unit list includes a displacement vector (xi−x, yi−y), and the displacement vector (xi−x, yi−y) is filled in the candidate motion information list.

In some embodiments, the information recorded in the historical unit list includes at least one of the following:
(1) information about a historical encoding and decoding unit whose prediction mode is an IBC prediction mode or an ISC prediction mode;
(2) coordinates of an upper left corner of at least one encoding and decoding block included in the historical encoding and decoding unit when a prediction mode of the historical encoding and decoding unit is an IBC prediction mode or an inter-frame prediction mode; or
(3) coordinates of at least one encoding and decoding string (which may be referred to as a "string" for short) included in the historical encoding and decoding unit when a prediction mode of the historical encoding and decoding unit is an ISC prediction mode. In some embodiments, coordinates of all strings included in a historical unit are recorded, or coordinates of strings whose length is greater than a threshold included in the historical unit are recorded.

In addition, when the candidate motion information list is updated, duplication checking and comparison may be performed. For example, duplication checking and comparison may be performed when initialization updating is performed on the initial candidate motion information list.

Based on the above, in this embodiment, when motion information included in the candidate motion information list is insufficient, the list is filled using extra motion information, to perform additionally filling on the candidate motion information list, so that more prediction displacement vectors that are more effective can be provided.

The technical solution provided in the embodiments of this application may be applicable to additionally filling on a motion information list in an intra-frame prediction mode, or may be applicable to additionally filling on a motion information list in an inter-frame prediction mode.

In an example, the technical solution provided in the embodiments of this application is used for additionally filling on a motion information list in the IBC prediction mode. For example, additionally filling is performed on a historical motion information list and/or a candidate motion information list in the IBC prediction mode according to the method described above.

In another example, the technical solution provided in the embodiments of this application is used for additionally filling on a motion information list in the ISC prediction mode. For example, additionally filling is performed on a historical motion information list and/or a candidate motion information list in the ISC prediction mode according to the method described above.

In another example, the technical solution provided in the embodiments of this application is used for additionally filling on a motion information list shared by the IBC prediction mode and the ISC prediction mode. For example, the IBC prediction mode and the ISC prediction mode may share one historical motion information list, such as the IntraHMVP list described above. Alternatively, the IBC prediction mode and the ISC prediction mode may also share one candidate motion information list, which is not limited in the embodiments of this application.

The following describes export about a prediction block vector in AVS3 standard text, where IntraHmvpCandidateList is a historical motion information list, NumOfIntraHmvpCand is an allowed maximum length of the list, CntIntraHmvp is an actual length of the list, and coordinates of the prediction block vector is denoted as (MvPredXBv, MvPredYBv):

The width and the height of the current PU are respectively denoted as widthCur and heightCur, and a horizontal coordinate and a vertical coordinate of an upper left corner of the current PU are respectively denoted as xCur and yCur. For a case that X ranges from 0 to NumOfIntraHmvpCand−1, a width and a height of IntraHmvpCandidateList[X] are respectively denoted as widthCandX and heightCandX, a horizontal coordinate and a vertical coordinate of an upper left corner of IntraHmvpCandidateList[X] are respectively denoted as xCandX and yCandX, a size of IntraHmvpCandidateList[X] is denoted as sizeCandX, a repetition times of IntraHmvpCandidateList[X] is denoted as cntCandX, and a displacement vector of IntraHmvpCandidateList[X] is denoted as intraMvCandX.

A class blockMotionClass Y (Y ranges from 0 to 6) is first constructed according to the following steps:

a) Initialize a number NumAllowedHbvpCand of optional candidate items in IBC prediction historical motion information to Min(CntIntraHmvp, NumOfIntraHmvpCand).

b) When NumAllowedHbvpCand is equal to 0, MvPredXBv and MvPredYBv are both equal to 0, and an export process is ended.

c) Otherwise (namely, when NumAllowedHbvpCand is not equal to 0), Y ranges from 0 to 6, to initialize a number cntClassY of candidate items of IBC prediction motion information of each class blockMotionClassY to 0. For a case that X ranges from 0 to NumAllowedHbvpCand−1, IntraHmvpCandidateList[X] is classified according to the following method:

1) when sizeCandX is greater than or equal to 64, IntraHmvpCandidateList[X] is added to blockMotionClass0, and a value of cntClassY is increased by 1;

2) when cntCandX is greater than or equal to 3, IntraHmvpCandidateList[X] is added to blockMotionClass1, and the value of cntClassY is increased by 1;

3) when xCandX is less than xCur and yCandX is less than yCur, IntraHmvpCandidateList[X] is added to blockMotionClass4, and the value of cntClassY is increased by 1;

4) otherwise, if xCandX is greater than or equal to xCur+widthCur, IntraHmvpCandidateList[X] is added to blockMotionClass5, and the value of cntClassY is increased by 1;

5) otherwise, if yCandX is greater than or equal to yCur+heightCur, IntraHmvpCandidateList[X] is added to blockMotionClass6, and the value of cntClassY is increased by 1;

6) otherwise, if yCandX is less than yCur, IntraHmvpCandidateList[X] is added to blockMotionClass3, and the value of cntClassY is increased by 1; and 7) otherwise, IntraHmvpCandidateList[X] is added to blockMotionClass2, and the value of cntClassY is increased by 1.

Then, a block vector of IBC motion information in blockMotionClassY is denoted as bvClassY, and a candidate class list CbvpCandidateList is exported according to the following method:

a) initialize cntCbvp, cntCheck, and Y to 0;

b) if the value of cntClassY is greater than 0, perform the following steps:

1) initialize candIdx to 0;

2) if cntCbvp is equal to 0 and a block vector of CbvpCandidateList[cntCbvp] is equal to bvClassY, cntCbvp is increased by 1, and step c) is performed;

3) otherwise, if a block vector CbvpCandidateList[candIdx] and bvClassY are the same, step c) is performed;

4) otherwise, candIdx is increased by 1, and step 3) is performed if candIdx is less than cntCheck; and 5) otherwise, if the block vector of CbvpCandidateList[cntCbvp] is equal to bvClassY, cntCbvp is increased by 1; and c) increase a value of Y by 1, and perform the following steps:

1) if the value of Y is less than or equal to 2, a value of cntCheck is set to cntCbvp, and continue to perform step b);

2) otherwise, if Y is less than 7, continue to perform step b); and 3) otherwise, end an export process of CbvpCandidateList.

If cntCbvp is equal to 0, MvPredXBv and MvPredYBv are both equal to 0; or otherwise, MvPredXBv and MvPredYBv are respectively equal to a horizontal coordinate and a vertical coordinate of CbvpCandidateList[CbvpIndex].

The following provides two examples, which requires to make the following modification on the sentence "if cntCbvp is equal to 0, MvPredXBv and MvPredYBv are both equal to 0; or otherwise, MvPredXBv and MvPredYBv are respectively equal to a horizontal coordinate and a vertical coordinate of CbvpCandidateList[CbvpIndex] in standard text:

Example 1: the candidate class list CbvpCandidateList is filled using (0, 0) according to the manner provided in the method 2 in the foregoing embodiments. The text is modified as follows:

If cntCbvp is less than 7, Y ranges from cntCbvp to 6, and the block vector of CbvpCandidateList[cntCbvp] is equal to (0, 0); or MvPredXBv and MvPredYBv are respectively equal to the horizontal coordinate and the vertical coordinate of CbvpCandidateList[CbvpIndex].

Example 2: the candidate class list CbvpCandidateList is filled using (0, 0), (−w, 0), (0, −h), (−w, −h), (−2*w, 0), (0, −2*h), and (−2*w, −2*h) according to the manner provided in the method 2 in the foregoing embodiments. The text is modified as follows:

If cntCbvp is less than 7, the following steps are performed:
a) initialize Y to 0;
B) perform the following steps:
1) initialize candIdx to 0;
2) if cntCbvp is equal to 0 and the block vector of CbvpCandidateList[cntCbvp] is equal to InitialIntraMvList[Y], cntCbvp is increased by 1, and step c) is performed;
3) otherwise, if the block vector of CbvpCandidateList [candIdx and InitialIntraMvList[Y] are the same, step c) is performed;
4) otherwise, candIdx is increased by 1, and step 3) is performed if candIdx is less than cntCbvp; and
5) otherwise, if the block vector of CbvpCandidateList [cntCbvp] is equal to InitialIntraMvList[Y], cntCbvp is increased by 1; and
c) increase the value of Y by 1, and perform the following steps:
1) continue to perform step b) if Y is less than 7; and
2) otherwise, end an export process of CbvpCandidateList.

A length of InitialIntraMvList is 7, and a zeroth item to a sixth item are sequentially (0, 0), (−w, 0), (0, −h), (−w, −h), (−2*w, 0), (0, −2*h), (−2*w, −2*h). MvPredXBv and MvPredYBv are respectively equal to the horizontal coordinate and the vertical coordinate of CbvpCandidateList [CbvpIndex].

The following is an apparatus embodiment of this application, which can be used to perform the method embodiments of this application. For details not disclosed in the apparatus embodiment of this application, reference may be made to the method embodiments of this application.

Figure 9:
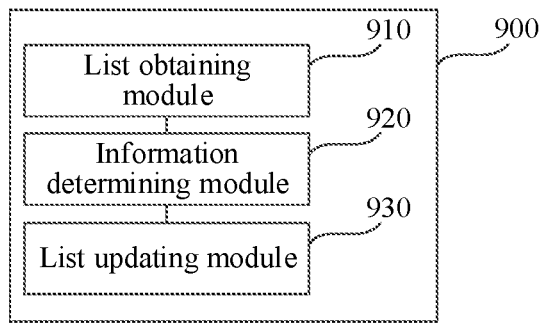
FIG. 9 is a block diagram of an apparatus for constructing a motion information list in video encoding and decoding according to an embodiment of this application.

FIG. 9 is a block diagram of an apparatus for constructing a motion information list in video encoding and decoding according to an embodiment of this application. The apparatus has functions of implementing the foregoing method examples. The functions may be implemented by hardware, or may be implemented by hardware executing corresponding software. The apparatus may be the computer device described above, or may be arranged on the computer device. The apparatus 900 may include: a list obtaining module 910, an information determining module 920, and a list updating module 930.

The list obtaining module 910 is configured to obtain a motion information list.

The information determining module 920 is configured to determine at least one piece of motion information when a length of the motion information list meets a condition, where the length refers to a number of pieces of motion information included in the motion information list.

The list updating module 930 is configured to add the at least one piece of motion information to the motion information list to obtain an updated motion information list.

In an exemplary embodiment, the motion information list is a historical motion information list, and the historical motion information list is used for recording historical motion information.

In an exemplary embodiment, the list updating module 930 is configured to:
use the at least one piece of motion information to update the historical motion information list when encoding or decoding starts to be performed on each coding tree unit (CTU) row in a picture; or
use the at least one piece of motion information to update the historical motion information list when encoding or decoding starts to be performed on each patch in a picture.

In an exemplary embodiment, the at least one piece of motion information includes at least one of the following:
motion information included in the historical motion information list after a target CTU is encoded or decoded;
motion information included in a sequence header or a picture header; or
at least one piece of preset motion information.

In an exemplary embodiment, the preset motion information includes a displacement vector; and the displacement vector includes at least one of the following: (0, 0), (−w, 0), (−2*w, 0), (0, −h), (0, −2*h), (−w, −h), (−w, −2*h), (−2*w, −h), or (−2*w, −2*h), where
w is a width of a minimum encoding and decoding unit, and h is a height of the minimum encoding and decoding unit.

In an exemplary embodiment, the preset motion information includes position information; and the position information includes at least one of the following:
coordinates of a pixel of a left boundary of a picture, where a horizontal coordinate is 0 and a value range of a vertical coordinate is [0, pic_h−1]);
coordinates of a pixel of an upper boundary of a picture, where a value range of a horizontal coordinate is [0, pic_w−1] and a vertical coordinate is 0;
coordinates of a pixel of a left boundary of a current CTU row, where a horizontal coordinate is 0 and a value range of a vertical coordinate is [y, y+ctu_h−1]);
coordinates of a pixel of an upper boundary of a current CTU row, where a value range of a horizontal coordinate is [0, pic_w−1] and a vertical coordinate is y;
coordinates of a pixel of a left boundary of a current CTU, where a horizontal coordinate is x and a value range of a vertical coordinate is [y, y+ctu_h−1]); or
coordinates of a pixel of an upper boundary of a current CTU, where a value range of a horizontal coordinate is [x, x+ctu_w−1] and a vertical coordinate is y, where
coordinates of an upper left corner of the current CTU are (x, y), a width of the picture is pic_w, a height of the picture is pic_h, a width of the current CTU is ctu_w, and a height of the current CTU is ctu_h.

In an exemplary embodiment, the preset motion information includes size information, and a value of the size information is less than or equal to a first threshold.

In an exemplary embodiment, the preset motion information includes a repetition times, and a value of the repetition times is less than or equal to a second threshold.

In an exemplary embodiment, a maximum length of the historical motion information list is N, and N is a positive integer; and the updating the historical motion information list includes adding M pieces of motion information to an end of the historical motion information list, where M is a positive integer less than or equal to N.

In an exemplary embodiment, the motion information list is a candidate motion information list, and the candidate motion information list is used for providing a candidate prediction displacement vector.

In an exemplary embodiment, the list updating module 930 is configured to use the at least one piece of motion information to update the candidate motion information list when a length of the candidate motion information list is less than a threshold.

In an exemplary embodiment, the at least one piece of motion information includes at least one of the following:

motion information included in a sequence header or a picture header;

at least one piece of preset motion information;

motion information exported from another historical motion information list, where the other motion historical motion information list includes a historical motion information list of an encoding and decoding unit adopting a prediction mode different from that of a current encoding and decoding unit;

motion information of a space adjacent unit of a current encoding and decoding unit; or motion information determined based on information recorded in a historical unit list, where the historical unit list records information of at least one historical encoding and decoding unit.

In an exemplary embodiment, the preset motion information includes a displacement vector; and the displacement vector includes at least one of the following: (0, 0), (−w, 0), (−2*w, 0), (0, −h), (0, −2*h), (−w, −h), (−w, −2*h), (−2*w, −h), or (−2*w, −2*h), where w is a width of the current encoding and decoding unit, and h is a height of the current encoding and decoding unit; or w is a width of a minimum encoding and decoding unit, and h is a height of the minimum encoding and decoding unit.

In an exemplary embodiment, when the candidate motion information list is used for providing a prediction displacement vector of an intra block copy (IBC) prediction mode or an intra string copy (ISC) prediction mode, the other historical motion information list includes a historical motion information list corresponding to an inter-frame prediction mode; or when the candidate motion information list is used for providing a prediction displacement vector of an inter-frame prediction mode, the other historical motion information list includes a historical motion information list corresponding to an IBC prediction mode or an ISC prediction mode.

In an exemplary embodiment, when the prediction mode of the current encoding and decoding unit is an IBC prediction mode or an ISC prediction mode, the space adjacent unit includes a space adjacent unit adopting the IBC prediction mode or the ISC prediction mode; or when the prediction mode of the current encoding and decoding unit is an inter-frame prediction mode, the space adjacent unit includes a space adjacent unit adopting the inter-frame prediction mode.

In an exemplary embodiment, the historical unit list includes a historical encoding and decoding unit whose coordinates are (xi, yi); and when the prediction mode of the current encoding and decoding unit is an IBC prediction mode and coordinates of an upper left corner of the current encoding and decoding unit are (x, y), the motion information determined based on the information recorded in the historical unit list includes a displacement vector (xi−x, yi−y); or when the prediction mode of the current encoding and decoding unit is an ISC prediction mode and coordinates of a first pixel of a current string in the current encoding and decoding unit are (x, y), the motion information determined based on the information recorded in the historical unit list includes a displacement vector (xi−x, yi−y).

In an exemplary embodiment, the information recorded in the historical unit list includes at least one of the following:

information about a historical encoding and decoding unit whose prediction mode is an IBC prediction mode or an ISC prediction mode;

coordinates of an upper left corner of at least one encoding and decoding block included in the historical encoding and decoding unit when a prediction mode of the historical encoding and decoding unit is an IBC prediction mode or an inter-frame prediction mode; or coordinates of at least one encoding and decoding string included in the historical encoding and decoding unit when a prediction mode of the historical encoding and decoding unit is an ISC prediction mode.

In an exemplary embodiment, the list updating module 930 is configured to:

perform duplication checking and comparison on to-be-added motion information and motion information already existing in the motion information list; and update the motion information list according to a duplication checking and comparison result to obtain the updated motion information list.

Based on the above, according to the technical solution provided in the embodiments of this application, by filling the motion information list using the extra motion information when the motion information included in the motion information list is insufficient, the motion information list is updated, so that more displacement vectors that are more effective are provided in the motion information list to achieve a better displacement vector prediction effect, thereby improving the video compression performance.

When the apparatus provided in the foregoing embodiments implements functions of the apparatus, the division of the foregoing functional modules is only an example for description. In an actual application, the functions may be assigned to and completed by different functional modules as required, that is, the internal structure of the device is divided into different functional modules, to implement all or some of the functions described above. In addition, the apparatus and method embodiments provided in the foregoing embodiments belong to one conception. For the specific implementation process, reference may be made to the method embodiments, and details are not described herein again.

Figure 10:
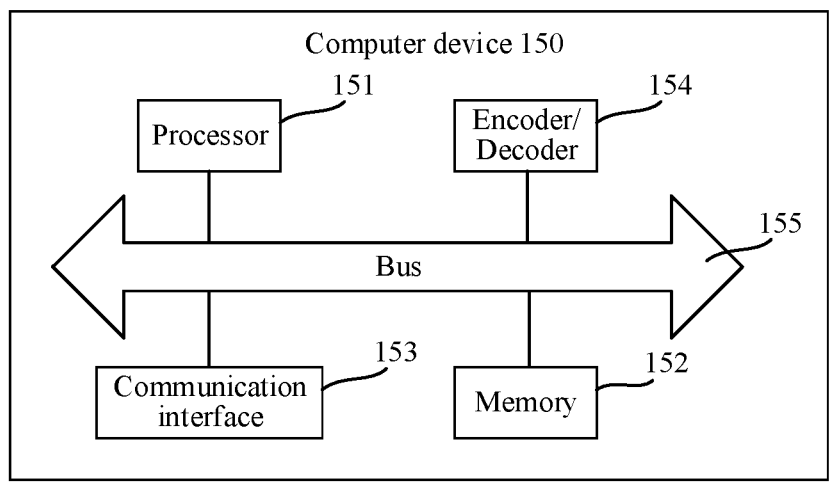
FIG. 10 is a structural block diagram of a computer device according to an embodiment of this application.

FIG. 10 is a schematic block diagram of a computer device according to an embodiment of this application. The computer device may be the encoder side device described above, or may be the decoder side device described above.

The computer device 150 may include a processor 151, a memory 152, a communication interface 153, an encoder/decoder 154, and a bus 155.

The processor 151 includes one or more processing cores. The processor 151 runs a software program and a module to execute various functional applications and perform information processing.

The memory 152 may be configured to store a computer program. The processor 151 is configured to execute the computer program, to implement the foregoing method for constructing a motion information list in video encoding and decoding.

The communication interface 153 may be configured to communicate with other devices, for example, receiving/transmitting audio and video data.

The encoder/decoder 154 may be configured to implement encoding and decoding functions, for example, encoding and decoding audio and video data.

The memory 152 is connected to the processor 151 through the bus 155.

In addition, the memory 152 may be implemented by any type of volatile or non-volatile storage device or a combination thereof. The volatile or non-volatile storage device includes, but not limited to: a magnetic disk, an optical disc, an electrically erasable programmable read-only memory (EEPROM), an erasable programmable read-only memory (EPROM), a static random access memory (SRAM), a read-only memory (ROM), a magnetic memory, a flash memory, or a programmable read-only memory (PROM).

A person skilled in the art may understand that the structure shown in FIG. 10 does not constitute any limitation to the computer device 150, and the computer device may include more components or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing method for constructing a motion information list in video encoding and decoding.

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium and executes the computer instructions, to cause the computer device to execute the foregoing method for constructing a motion information list in video encoding and decoding.

It is to be understood that "plurality of" mentioned in this specification means two or more. "And/or" describes an association relationship for associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely examples of the embodiments of this application, but are not intended to limit this application. Any modification, equivalent replacement, or improvement made without departing from the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for constructing a motion information list in video encoding and decoding, the method comprising:
   obtaining a motion information list, wherein the motion information list is a candidate motion information list that is used for providing a candidate prediction displacement vector;
   determining at least one piece of motion information when a length of the motion information list meets a condition, the length referring to a number of pieces of motion information comprised in the motion information list; and
   adding the at least one piece of motion information to the candidate motion information list to obtain an updated motion information list when a length of the candidate motion information list is less than a threshold, wherein the motion information list is a historical motion information list used for recording historical motion information and the at least one piece of motion information includes motion information exported from another historical motion information list, wherein the another motion historical motion information list comprises a historical motion information list of an encoding and decoding unit adopting a prediction mode different from that of a current encoding and decoding unit and at least one piece of preset motion information comprising a displacement vector; and the displacement vector comprises at least one of the following:
   (0, 0), (−w, 0), (−2*w, 0), (0, −h), (0, −2*h), (−w, −h), (−w, −2*h), (−2*w, −h), or (−2*w, −2*h), wherein w is a width of a minimum encoding and decoding unit, and h is a height of the minimum encoding and decoding unit; and
   wherein the preset motion information further comprises position information; and the position information comprises at least one of the following:
   coordinates of a pixel of a left boundary of a picture, wherein a horizontal coordinate is 0 and a value range of a vertical coordinate is [0, pic_h−1]);
   coordinates of a pixel of an upper boundary of a picture, wherein a value range of a horizontal coordinate is [0, pic_w−1] and a vertical coordinate is 0;
   coordinates of a pixel of a left boundary of a current CTU row, wherein a horizontal coordinate is 0 and a value range of a vertical coordinate is [y, y+ctu_h−1]);
   coordinates of a pixel of an upper boundary of a current CTU row, wherein a value range of a horizontal coordinate is [0, pic_w−1] and a vertical coordinate is y;
   coordinates of a pixel of a left boundary of a current CTU, wherein a horizontal coordinate is x and a value range of a vertical coordinate is [y, y+ctu_h−1]); or coordinates of a pixel of an upper boundary of a current CTU, wherein a value range of a horizontal coordinate is [x, x+ctu_w−1] and a vertical coordinate is y, wherein coordinates of an upper left corner of the current CTU are (x, y), a width of the picture is pic_w, a height of the picture is pic_h, a width of the current CTU is ctu_w, and a height of the current CTU is ctu_h.

2. The method according to claim 1, further comprising:
using the at least one piece of motion information to update the historical motion information list when encoding or decoding starts to be performed on each coding tree unit (CTU) row in a picture;
or
using the at least one piece of motion information to update the historical motion information list when encoding or decoding starts to be performed on each patch in a picture.

3. The method according to claim 1, wherein the at least one piece of motion information comprises at least one of the following:
motion information comprised in the historical motion information list after a target CTU is encoded or decoded; or
motion information comprised in a sequence header or a picture header.

4. The method according to claim 1, wherein the preset motion information further comprises size information, and a value of the size information is less than or equal to a first threshold.

5. The method according to claim 1, wherein the preset motion information further comprises a repetition times, and a value of the repetition times is less than or equal to a second threshold.

6. The method according to claim 1, wherein a maximum length of the historical motion information list is N, and N is a positive integer; and
recording the historical motion information list comprises adding M pieces of motion information to an end of the historical motion information list, wherein M is a positive integer less than or equal to N.

7. The method according to claim 1, wherein the at least one piece of motion information comprises at least one of the following:
motion information comprised in a sequence header or a picture header;
motion information of a space adjacent unit of a current encoding and decoding unit; or
motion information determined based on information recorded in a historical unit list, wherein the historical unit list records information of at least one historical encoding and decoding unit.

8. The method according to claim 7, wherein
when the candidate motion information list is used for providing a prediction displacement vector of an intra block copy (IBC) prediction mode or an intra string copy (ISC) prediction mode, the other historical motion information list comprises a historical motion information list corresponding to an inter-frame prediction mode;
or
when the candidate motion information list is used for providing a prediction displacement vector of an inter-frame prediction mode, the other historical motion information list comprises a historical motion information list corresponding to an IBC prediction mode or an ISC prediction mode.

9. The method according to claim 7, wherein
when the prediction mode of the current encoding and decoding unit is an IBC prediction mode or an ISC prediction mode, the space adjacent unit comprises a space adjacent unit adopting the IBC prediction mode or the ISC prediction mode;
or
when the prediction mode of the current encoding and decoding unit is an inter-frame prediction mode, the space adjacent unit comprises a space adjacent unit adopting the inter-frame prediction mode.

10. The method according to claim 7, wherein the historical unit list comprises a historical encoding and decoding unit whose coordinates are (xi, yi); and
when the prediction mode of the current encoding and decoding unit is an IBC prediction mode and coordinates of an upper left corner of the current encoding and decoding unit are (x, y), the motion information determined based on the information recorded in the historical unit list comprises a displacement vector (xi-x, yi-y); or
when the prediction mode of the current encoding and decoding unit is an ISC prediction mode and coordinates of a first pixel of a current string in the current encoding and decoding unit are (x, y), the motion information determined based on the information recorded in the historical unit list comprises a displacement vector (xi-x, yi-y).

11. The method according to claim 7, wherein the information recorded in the historical unit list comprises at least one of the following:
information about a historical encoding and decoding unit whose prediction mode is an IBC prediction mode or an ISC prediction mode;
coordinates of an upper left corner of at least one encoding and decoding block comprised in the historical encoding and decoding unit when a prediction mode of the historical encoding and decoding unit is an IBC prediction mode or an inter-frame prediction mode; or
coordinates of at least one encoding and decoding string comprised in the historical encoding and decoding unit when a prediction mode of the historical encoding and decoding unit is an ISC prediction mode.

12. The method according to claim 1, wherein the adding the at least one piece of motion information to the motion information list to obtain an updated motion information list comprises:
performing duplication checking and comparison on to-be-added motion information and motion information already existing in the motion information list; and
updating the motion information list according to a duplication checking and comparison result to obtain the updated motion information list.

13. A computer device, comprising a processor and a memory, the memory storing at least one instruction, the at least one instruction, when executed by the processor, causes the computing device to perform operations comprising:
obtaining a motion information list, wherein the motion information list is a candidate motion information list that is used for providing a candidate prediction displacement vector;
determining at least one piece of motion information when a length of the motion information list meets a condition, the length referring to a number of pieces of motion information comprised in the motion information list; and adding the at least one piece of motion information to the candidate motion information list to obtain an updated motion information list when a length of the candidate motion information list is less than a threshold, wherein the motion information list is a historical motion information list used for recording historical motion information and the at least one piece of motion information includes motion information exported from another historical motion information list, wherein the another motion historical motion information list comprises a historical motion information list of an encoding and decoding unit adopting a prediction mode different from that of a current encoding and decoding unit and at least one piece of preset motion information comprising a displacement vector; and the displacement vector comprises at least one of the following:

(0, 0), (−w, 0), (−2*w, 0), (0, −h), (0, −2*h), (−w, −h), (−w, −2*h), (−2*w, −h), or (−2*w, −2*h), wherein w is a width of a minimum encoding and decoding unit, and h is a height of the minimum encoding and decoding unit; and wherein the preset motion information further comprises position information; and the position information comprises at least one of the following:
  coordinates of a pixel of a left boundary of a picture, wherein a horizontal coordinate is 0 and a value range of a vertical coordinate is [0, pic_h−1]);
  coordinates of a pixel of an upper boundary of a picture, wherein a value range of a horizontal coordinate is [0, pic_w−1] and a vertical coordinate is 0;
  coordinates of a pixel of a left boundary of a current CTU row, wherein a horizontal coordinate is 0 and a value range of a vertical coordinate is [y, y+ctu_h−1]);
  coordinates of a pixel of an upper boundary of a current CTU row, wherein a value range of a horizontal coordinate is [0, pic_w−1] and a vertical coordinate is y;
  coordinates of a pixel of a left boundary of a current CTU, wherein a horizontal coordinate is x and a value range of a vertical coordinate is [y, y+ctu_h−1]); or
  coordinates of a pixel of an upper boundary of a current CTU, wherein a value range of a horizontal coordinate is [x, x+ctu_w−1] and a vertical coordinate is y, wherein
coordinates of an upper left corner of the current CTU are (x, y), a width of the picture is pic_w, a height of the picture is pic_h, a width of the current CTU is ctu_w, and a height of the current CTU is ctu_h.

14. The computer device according to claim 13, wherein the operations further comprise:
  using the at least one piece of motion information to update the historical motion information list when encoding or decoding starts to be performed on each coding tree unit (CTU) row in a picture;
  or
  using the at least one piece of motion information to update the historical motion information list when encoding or decoding starts to be performed on each patch in a picture.

15. A non-transitory computer-readable storage medium, storing at least one instruction, the at least one instruction, when executed by a processor of a computer device, causes the computing device to perform operations comprising:
  obtaining a motion information list, wherein the motion information list is a candidate motion information list that is used for providing a candidate prediction displacement vector;
  determining at least one piece of motion information when a length of the motion information list meets a condition, the length referring to a number of pieces of motion information comprised in the motion information list; and
  adding the at least one piece of motion information to the candidate motion information list to obtain an updated motion information list when a length of the candidate motion information list is less than a threshold, wherein the motion information list is a historical motion information list used for recording historical motion information and the at least one piece of motion information includes motion information exported from another historical motion information list, wherein the another motion historical motion information list comprises a historical motion information list of an encoding and decoding unit adopting a prediction mode different from that of a current encoding and decoding unit and at least one piece of preset motion information comprising a displacement vector; and the displacement vector comprises at least one of the following:

(0, 0), (−w, 0), (−2*w, 0), (0, −h), (0, −2*h), (−w, −h), (−w, −2*h), (−2*w, −h), or (−2*w, −2*h), wherein w is a width of a minimum encoding and decoding unit, and h is a height of the minimum encoding and decoding unit; and wherein the preset motion information further comprises position information; and the position information comprises at least one of the following:
  coordinates of a pixel of a left boundary of a picture, wherein a horizontal coordinate is 0 and a value range of a vertical coordinate is [0, pic_h−1]);
  coordinates of a pixel of an upper boundary of a picture, wherein a value range of a horizontal coordinate is [0, pic_w−1] and a vertical coordinate is 0;
  coordinates of a pixel of a left boundary of a current CTU row, wherein a horizontal coordinate is 0 and a value range of a vertical coordinate is [y, y+ctu_h−1]);
  coordinates of a pixel of an upper boundary of a current CTU row, wherein a value range of a horizontal coordinate is [0, pic_w−1] and a vertical coordinate is y;
  coordinates of a pixel of a left boundary of a current CTU, wherein a horizontal coordinate is x and a value range of a vertical coordinate is [y, y+ctu_h−1]); or
  coordinates of a pixel of an upper boundary of a current CTU, wherein a value range of a horizontal coordinate is [x, x+ctu_w−1] and a vertical coordinate is y, wherein
coordinates of an upper left corner of the current CTU are (x, y), a width of the picture is pic_w, a height of the picture is pic_h, a width of the current CTU is ctu_w, and a height of the current CTU is ctu_h.

* * * * *